(12) United States Patent
Loomis et al.

(10) Patent No.: US 7,912,920 B2
(45) Date of Patent: Mar. 22, 2011

(54) STREAM SOURCING CONTENT DELIVERY SYSTEM

(76) Inventors: Stephen Loomis, Redwood City, CA (US); David Biderman, San Francisco, CA (US); Simon Gibson, Washington, DC (US); Thomas Pepper, Boulder Creek, CA (US); Andrew Dickson, San Francisco, CA (US)

( * ) Notice: Subject to any disclaimer, the term of this patent is extended or adjusted under 35 U.S.C. 154(b) by 1274 days.

(21) Appl. No.: 10/688,283

(22) Filed: Oct. 16, 2003

(65) Prior Publication Data

US 2004/0186733 A1 Sep. 23, 2004

Related U.S. Application Data

(60) Provisional application No. 60/433,734, filed on Dec. 13, 2002.

(51) Int. Cl.
*G06F 15/16* (2006.01)
(52) U.S. Cl. ......... 709/219; 709/203; 709/231; 709/232
(58) Field of Classification Search .......... 709/203–204, 709/217–219, 230–232
See application file for complete search history.

(56) References Cited

U.S. PATENT DOCUMENTS

| | | | |
|---|---|---|---|
| 5,168,481 A | 12/1992 | Culbertson et al. | |
| 5,325,238 A | 6/1994 | Stebbings et al. | |
| 5,410,343 A | 4/1995 | Coddington et al. | |
| 5,517,672 A | 5/1996 | Reussner et al. | |
| 5,528,513 A | 6/1996 | Vaitzbilt et al. | |
| 5,585,866 A | 12/1996 | Miller et al. | |
| 5,616,876 A | 4/1997 | Cluts | |
| 5,644,715 A | 7/1997 | Baugher | |
| 5,671,195 A | 9/1997 | Lee | |
| 5,715,314 A | 2/1998 | Payne et al. | |
| 5,734,119 A | 3/1998 | France et al. | |
| 5,761,417 A | 6/1998 | Henley et al. | |
| 5,774,672 A * | 6/1998 | Funahashi et al. ............ 709/231 |

(Continued)

FOREIGN PATENT DOCUMENTS

EP 1113605 A2 7/1991

(Continued)

OTHER PUBLICATIONS

Hodson, O., Perkins, C., Hardman, V., "Skew detection and compensation for Inernet audio application" Part vol. 3, p. 1687-90, 2000 IEEE international Conference on Multimedia Proceedings, USA.

(Continued)

*Primary Examiner* — Joshua Joo
(74) *Attorney, Agent, or Firm* — Schwabe, Williamson & Wyatt, P.C.

(57) ABSTRACT

The stream sourcing content delivery system goes to a database and builds a physical stream, based on a schedule. The stream source content delivery system works at a station ID (SID), finds the order of the delivery of content for the station based upon the schedule, and downloads a plurality of music files to its hard drive to enable play back. The stream source content delivery system then concatenates the files, to create stream, and awaits the request of one or more stream recipients. Some preferred system embodiments further comprise a fail-safe mode, whereby a loop of music is generated from the downloaded stream, and is delivered to one or more users when further access to content is interrupted, such that recipients experience an uninterrupted delivery of a plurality of files, e.g. songs.

42 Claims, 12 Drawing Sheets

U.S. PATENT DOCUMENTS

| | | |
|---|---|---|
| 5,784,597 A | 7/1998 | Chiu et al. |
| 5,787,482 A | 7/1998 | Chen et al. |
| 5,790,174 A | 8/1998 | Richard, III et al. |
| 5,792,971 A | 8/1998 | Timis et al. |
| 5,802,502 A | 9/1998 | Gell et al. |
| 5,819,160 A | 10/1998 | Foldare et al. |
| 5,892,900 A | 4/1999 | Ginter et al. |
| 5,907,827 A | 5/1999 | Fang et al. |
| 5,910,987 A | 6/1999 | Ginter et al. |
| 5,913,039 A | 6/1999 | Nakamura |
| 5,915,019 A | 6/1999 | Ginter et al. |
| 5,917,912 A | 6/1999 | Ginter et al. |
| 5,920,861 A | 7/1999 | Hall et al. |
| 5,930,765 A | 7/1999 | Martin |
| 5,943,422 A | 8/1999 | Van Wie et al. |
| 5,944,778 A | 8/1999 | Takeuchi et al. |
| 5,949,876 A | 9/1999 | Ginter et al. |
| 5,956,321 A | 9/1999 | Yao et al. |
| 5,956,491 A | 9/1999 | Marks |
| 5,959,945 A | 9/1999 | Kleiman |
| 5,963,914 A | 10/1999 | Skinner et al. |
| 5,982,891 A | 11/1999 | Ginter et al. |
| 5,991,867 A | 11/1999 | Fosmark |
| 5,996,015 A | 11/1999 | Day et al. |
| 6,029,257 A | 2/2000 | Palmer |
| 6,031,797 A | 2/2000 | Van Ryzin et al. |
| 6,041,354 A | 3/2000 | Biliris et al. |
| 6,044,398 A | 3/2000 | Marullo et al. |
| 6,061,722 A | 5/2000 | Lipa et al. |
| 6,067,562 A | 5/2000 | Goldman |
| 6,088,722 A | 7/2000 | Herz |
| 6,112,023 A | 8/2000 | Dave et al. |
| 6,112,181 A | 8/2000 | Shear et al. |
| 6,138,119 A | 10/2000 | Hall et al. |
| 6,157,721 A | 12/2000 | Shear et al. |
| 6,157,940 A | 12/2000 | Marullo et al. |
| 6,160,812 A | 12/2000 | Bauman et al. |
| 6,163,683 A | 12/2000 | Dunn et al. |
| 6,173,325 B1 | 1/2001 | Kukreja |
| 6,185,683 B1 | 2/2001 | Ginter et al. |
| 6,185,701 B1 | 2/2001 | Marullo et al. |
| 6,192,340 B1 | 2/2001 | Abecassis |
| 6,195,701 B1 | 2/2001 | Kaiserworth et al. |
| 6,199,076 B1 | 3/2001 | Logan et al. |
| 6,222,530 B1 | 4/2001 | Sequiera |
| 6,226,672 B1 | 5/2001 | DeMartin et al. |
| 6,237,786 B1 | 5/2001 | Ginter et al. |
| 6,240,185 B1 | 5/2001 | Van Wie et al. |
| 6,243,328 B1 | 6/2001 | Fenner et al. |
| 6,243,725 B1 | 6/2001 | Hempleman et al. |
| 6,247,061 B1 | 6/2001 | Douceir |
| 6,248,946 B1 | 6/2001 | Dwek |
| 6,253,193 B1 | 6/2001 | Ginter et al. |
| 6,262,569 B1 | 7/2001 | Carr et al. |
| 6,263,313 B1 | 7/2001 | Milsted et al. |
| 6,263,362 B1 | 7/2001 | Donoho et al. |
| 6,266,788 B1 | 7/2001 | Othmer et al. |
| 6,300,880 B1 | 10/2001 | Sitnik |
| 6,314,576 B1 | 11/2001 | Asamizuya et al. |
| 6,332,163 B1 | 12/2001 | Bowman-Amuah |
| 6,356,936 B1 | 3/2002 | Donoho et al. |
| 6,363,488 B1 | 3/2002 | Ginter et al. |
| 6,366,914 B1 | 4/2002 | Stern |
| 6,389,402 B1 | 5/2002 | Ginter et al. |
| 6,421,651 B1 | 7/2002 | Tedesco et al. |
| 6,427,140 B1 | 7/2002 | Ginter et al. |
| 6,430,537 B1 | 8/2002 | Tedesco et al. |
| 6,434,621 B1 | 8/2002 | Pezzillo et al. |
| 6,434,628 B1 | 8/2002 | Bowman-Amuah |
| 6,438,450 B1 | 8/2002 | DiLorenzo |
| 6,438,630 B1 | 8/2002 | DeMoney |
| 6,441,832 B1 | 8/2002 | Tao et al. |
| 6,446,080 B1 | 9/2002 | Van Ryzin et al. |
| 6,446,125 B1 | 9/2002 | Huang et al. |
| 6,446,126 B1 | 9/2002 | Huang et al. |
| 6,449,367 B2 | 9/2002 | Van Wie et al. |
| 6,453,316 B1 | 9/2002 | Kairbe et al. |
| 6,477,541 B1 | 11/2002 | Korst et al. |
| 6,477,707 B1 | 11/2002 | King et al. |
| 6,492,469 B2 | 12/2002 | Willis et al. |
| 6,496,744 B1 | 12/2002 | Cook |
| 6,502,194 B1 | 12/2002 | Berman et al. |
| 6,505,160 B1 | 1/2003 | Levy et al. |
| 6,519,648 B1 | 2/2003 | Eyal |
| 6,526,411 B1 | 2/2003 | Ward |
| 6,529,586 B1 | 3/2003 | Elvins et al. |
| 6,536,037 B1 | 3/2003 | Guheen et al. |
| 6,542,445 B2 | 4/2003 | Ijichi et al. |
| 6,546,397 B1 | 4/2003 | Rempell |
| 6,550,057 B1 | 4/2003 | Bowman-Amuah |
| 6,601,041 B1 | 7/2003 | Brown et al. |
| 6,609,097 B2 * | 8/2003 | Costello et al. ............... 370/474 |
| 6,618,424 B1 | 9/2003 | Yamada et al. |
| 6,618,484 B1 | 9/2003 | Van Wie et al. |
| 6,658,568 B1 | 12/2003 | Ginter et al. |
| 6,668,325 B1 | 12/2003 | Collberg et al. |
| 6,725,275 B2 | 4/2004 | Eyal |
| 6,772,340 B1 | 8/2004 | Peinado et al. |
| 6,772,435 B1 | 8/2004 | Thexton et al. |
| 6,910,220 B2 | 6/2005 | Hickey et al. |
| 6,950,623 B2 | 9/2005 | Brown et al. |
| 7,020,710 B2 | 3/2006 | Weber et al. |
| 7,020,893 B2 | 3/2006 | Connelly |
| 7,024,485 B2 | 4/2006 | Dunning et al. |
| 7,043,479 B2 * | 5/2006 | Ireton ................................ 1/1 |
| 7,136,906 B2 | 11/2006 | Giacalone, Jr. |
| 7,185,352 B2 | 2/2007 | Halford et al. |
| 7,222,354 B1 * | 5/2007 | Ching et al. ..................... 725/35 |
| 7,412,532 B2 | 8/2008 | Gondhalekar et al. |
| 7,493,289 B2 | 2/2009 | Verosub et al. |
| 2001/0003828 A1 | 6/2001 | Peterson et al. |
| 2001/0030660 A1 | 10/2001 | Zainoulline |
| 2001/0044851 A1 | 11/2001 | Rothman et al. |
| 2002/0032907 A1 | 3/2002 | Daneils |
| 2002/0059237 A1 | 5/2002 | Kumagai et al. |
| 2002/0059624 A1 | 5/2002 | Machida et al. |
| 2002/0068525 A1 | 6/2002 | Brown et al. |
| 2002/0078056 A1 | 6/2002 | Hunt et al. |
| 2002/0082914 A1 | 6/2002 | Beyda et al. |
| 2002/0091761 A1 * | 7/2002 | Lambert ......................... 709/219 |
| 2002/0095510 A1 | 7/2002 | Sie et al. |
| 2002/0104099 A1 | 8/2002 | Novak |
| 2002/0107968 A1 | 8/2002 | Horn et al. |
| 2002/0108395 A1 | 8/2002 | Fujita et al. |
| 2002/0152876 A1 | 10/2002 | Hughes et al. |
| 2002/0152878 A1 | 10/2002 | Akashi |
| 2002/0158895 A1 * | 10/2002 | Murase et al. ................. 345/716 |
| 2002/0198846 A1 | 12/2002 | Lao |
| 2003/0014436 A1 | 1/2003 | Spencer et al. |
| 2003/0018797 A1 | 1/2003 | Dunning et al. |
| 2003/0023973 A1 | 1/2003 | Monson et al. |
| 2003/0023975 A1 | 1/2003 | Schrader et al. |
| 2003/0028659 A1 | 2/2003 | Mesarina et al. |
| 2003/0028893 A1 * | 2/2003 | Addington ...................... 725/115 |
| 2003/0048418 A1 * | 3/2003 | Hose et al. ...................... 352/123 |
| 2003/0069768 A1 | 4/2003 | Hoffman et al. |
| 2003/0069854 A1 | 4/2003 | Hsu et al. |
| 2003/0121050 A1 | 6/2003 | Kalva et al. |
| 2003/0126275 A1 | 7/2003 | Mungavan et al. |
| 2003/0135605 A1 | 7/2003 | Pendakur |
| 2003/0195974 A1 | 10/2003 | Ronning et al. |
| 2003/0236906 A1 * | 12/2003 | Klemets et al. ................ 709/231 |
| 2004/0064507 A1 | 4/2004 | Sakata |
| 2004/0138948 A1 | 7/2004 | Loomis |
| 2004/0177115 A1 | 9/2004 | Hollander et al. |
| 2004/0222047 A1 * | 11/2004 | DiFranza et al. ............. 187/391 |
| 2005/0056494 A1 * | 3/2005 | Amo et al. ...................... 187/396 |
| 2005/0114529 A1 * | 5/2005 | Lambert ......................... 709/228 |
| 2005/0114757 A1 * | 5/2005 | Sahota et al. ............... 715/501.1 |
| 2005/0159104 A1 | 7/2005 | Valley et al. |
| 2006/0155400 A1 | 7/2006 | Loomis |
| 2009/0164794 A1 | 6/2009 | Verosub et al. |
| 2009/0175591 A1 | 7/2009 | Gondhalekar et al. |

FOREIGN PATENT DOCUMENTS

| | | | |
|---|---|---|---|
| EP | 0831608 | A2 | 3/1998 |
| EP | 0875846 | A2 | 11/1998 |

| | | |
|---|---|---|
| EP | 0984584 | 3/2000 |
| EP | 0986046 A1 | 3/2000 |
| EP | 1 178 487 A1 | 2/2002 |
| EP | 1178487 A1 | 2/2002 |
| EP | 1178487 A1 | 2/2002 |
| EP | 1 187 423 A2 | 3/2002 |
| EP | 1187423 A2 | 3/2002 |
| EP | 1187423 A2 | 3/2002 |
| EP | 1 229 476 A2 | 8/2002 |
| EP | 1229476 A2 | 8/2002 |
| EP | 1229476 A2 | 8/2002 |
| EP | 1 244 021 A1 | 9/2002 |
| EP | 1244021 A1 | 9/2002 |
| EP | 1244021 A1 | 9/2002 |
| EP | 1 267 247 A2 | 12/2002 |
| EP | 1267247 A2 | 12/2002 |
| EP | 1267247 A2 | 12/2002 |
| EP | 1 286 351 A2 | 2/2003 |
| EP | 1286351 A2 | 2/2003 |
| EP | 1286351 A2 | 2/2003 |
| EP | 1187485 B1 | 4/2003 |
| JP | 2002108395 | 4/2002 |
| JP | 2002318587 | 10/2002 |
| JP | 2003068968 A | 3/2003 |
| JP | 2003069768 | 3/2003 |
| TW | 497055 | 8/2002 |
| WO | WO 01/10496 A2 | 2/2001 |
| WO | WO 02/063414 | 8/2002 |
| WO | WO-02063414 A2 | 8/2002 |

OTHER PUBLICATIONS

Aurrecoechea, C., Campbell, A., Hauw, L., "A Survey of QoS Architectures", Columbia University, New York.
Cen,S., Pu, R., Staehi, R.,Walpole, J., "A Distributed Real-Time MPEG Video Audio Player", Dept of Computer Science and Engineering, Oregon Graduate Institute of Science and Technology.
Manouselis,N.,Karampiperis, P., Vardiambasis,I.O., Maras, A., "Digital Audio Broadcasting Systems under a QoS Perspective", Telecommunications Laboratory, Dept. of Electronics & Computer Engineering, Technical University of Crete, Greece.
"Helix Universal Gateway Configuration Guide", RealNetworks Technical Blueprint Series.
Sion, R., Elmagarmid, A., Prabhakar, S., Rezgui, A., Challenges in designing a QoS aware Media Repository (working draft) Computer Science, Purdue University, IN.
Chen, Z., Tan,S.-M., Campbell, R., Li, Y., "Real Time Video and Audio in the World Wide Web". Dept. of Computer Science, Univ. of Illinios, Champagne—Urbana.
"Content Networking with the Helix Platform", RealNetworks White Paper Series, Jul. 2002 .
Hess, C., Media Streaming Protocol: An Adaptive Protocol for the Delivery of Audio and Video Over the Internet, 1998, Univ. of Illinois, Champagne-Urbana.
Koster, R., "Design of a Multimedia Player with Advanced QoS Control", Jan. 1997, Oregon Graduate Institute of Science and Technology.
Poellabauer, C., Schwan; K., West, R., "Coordinated CPU and Event Scheduling for Distributed Multimedia Applications", ACM Multimedia, Oct. 2001, Ottawa, Ontario, CA.
Takao, S., Takiyoshi, Y., Watanabe, K., Kohei, E., "packet Synchronization Recovery Circuit" Jun. 29, 1992, vol. 16, No. 294, p. 120.
A Network Flow Model for Playlist Generation; Department of Electrical Engineering, Univeristy of Minnesota.
Learning a Gaussian Process Prior for Automatically Generating Music Playlists; Microsoft Corporation.
EasyLiving:Technologies for Intelligent Environments; Microsoft Research.
Intelligent Multicast Internet Radio; University of Dublin.
Flytrap: Intelligent Group Music Recommendation; IUI 02. 2002 International Conference on Intelligent User Interfaces.
Virtual Jukebox; reviving a classic; Proceedings of the 35th Annual Hawaii International Conference on System Sciences, p. 887-93.
The MP3 Revolution; IEEE Intelligent Systems vol. 14, No. 3, p. 8-9.

The Valid Web: an Infrastructure for Temporal Management of Web Documents; ADVIS 2000; Lecture Notes in Computer Science; vol. 1909, p. 294-303, Izmir, Turkey; pub: Soringer-Verlag; 2000; xvi-460pp.; Germany.
Usability Studies and Designing Navigational Aids for the World Wide Web; 6th Intl World Wide Web Conf.; Santa Clara, CA; USA; Pub: Elsevier Comput. Netw. ISDN Syste; vol. 29, No. 8-13, p. 1489-96; Sep. 1997; Netherlands.
"Web based Protection and Secure Distribution for Digital Music", Proceedings, International Conference on Internet and Multimedia Systems and Applications p. 102-107, Hawaii, USA.
Apple's iTunes Music Store—http://www.apple.com/music/store.
Conference Paper: IP Data Over Satelite to Cable Headends and a New Operation Model with Digital Store and Forward Multi-Media System.
Narasimha, R. et al. "I/O Issues in a Multimedia System"; Computer, vol. 27, No. 3, p. 69-74, Mar. 1994, USA.
Ramakrishnan, K.K. et al; "Operating system Support for a video-on-demand file service"; Multimedia Systems; vol. 3, No. 2, p. 53-65, 1995 West Germany.
Nwosu, K.C. et al "Data Allocation and Spatio-Temporal Implications for Video-on-Demand Systems"; Proceedings of 1995 14th Annual Phoenix Conference on Computers and Communications; (Cat. No. 95CH35751), p. 629-35; IEEE: 1995 USA.
Eun, S,: et al. "Nonpreemptive scheduling algorithms for multimedia communication in local area networks"; Proceedings 1995 Int'l Conf on Network Protocols (Cat. No. 95TB8122) p. 356-IEEE Comput. Soc. Press; 1995 Los Alamitos, CA USA 1996.
Nakajima, T.; "A Dynamic QoS control based on Optimistic processor reservation"; Proceedings of the Intn'l onf. on Multimedia Computing and Systems (Cat. No. 96TB100057), p. 95-103, IEEE Comp. Soc. 1996, Los Alamitos, CA.
Orji, C.U. et al; "Spatio-temporal effects of mutimedia objects storage delivery on video-on-demand systems"; Mutlimedia Sytems; vol. 5, No. 1, p. 39-52, Springer-Verlag; Jan. 1997, Germany.
Kenchammana-Hosekote, D.R., et al.; "I/O scheduling for digital continuous media"; Mutlimedia Systems, vol. 5, No. 4, p. 213-37, Springer-Verlag, Jul. 1997 Germany.
Matsui, Y et al.; "VoR: a network system framework for VBRT over reserved bandwidth"; Interactive Distributed Mutlimedia Systems and Telecommunications Services, 4th Int'l Workshop, IDMS '97 Proceedings; p. 189-98, Springer-Verlag; 1997, Berlin, Germany.
Luling, R. et al.; "Communication Scheduling in a Distributed memory parallel interactive continuous media server system"; Proceeedings of 1998 ICPP Workshop on Architectural systems and OS Support for Multimedia Applications Flexible Communications Systems, Wireless Networks and Mobile Computing; (Cat. No. 98EX206) p. 56-65; IEEE Comput. Soc, 1998 Los Alamitos, CA USA.
Seongbae, E., et al; A real-time scheduling algorithim for multimedia communication in samll dedicated multimedia systems; KISS(A) (Computer Systems and Theory) vol. 25, No. 5, p. 492-502; Korea Inf. Sci. Soc; May 1998, South Korea, 1999.
Garofalakis, M.N., et al. "Resource scheduling in enhanced pay-per-view continuous media databases"; Proceedings of 23rd Int'l Conf. On Very Large Databases; p. 516-25; Morgan, Kaufman Publishers, 1997, San Francisco, CA USA 1999.
Mostefaoui, A.; "Exploiting data structures in a high performance video server for TV archives"; Proceedings of the Int'l Symposium on Digital Media information Base, p. 516-25, World Scientific, 1998 Singapore.
Garofalakis, M.N., On periodic resource scheduling for continuous media databases: VLDB Journal, vol. 7, No. 4, p. 206-25; 1998 Springer Verlag, germany 1999.
Hwee-Hwa, P., et al., "Resource Scheduling In A High Performance Multimedia Server," Mar.-Apr. 1999, IEEE, USA.
Young-Uhg, L. et al,"Performance analysis and evaluation of allocating subbanded video dta block on MZR disk arrays"; Proceedings of the High Performance Computing (HPC'98) p. 335-40, Soc for Comp Simulation Intn'l 1998, San Diego, CA, USA.
Feng, C. et al.; "An architecture of distributed media servers for supporting guaranteed QoS and media indexing", IEEE Intn'l Conf on Multimedia Computing and Systems, Part vol. 2 IEEE Comp. Soc. 2 vol. 1999 Los Alamitos, CA 1999.

To, T.-P.J. et al "Dynamic optimization of readsize in hypermedia servers"; IEEE Intn'l Conf on Multimedia Computing and Systems; Part vol. 2, p. 486-91, Pub. IEEE Comput. Soc, 2 vol. 1999 Los Alamitos, CA USA.

Lee, W. et al., "QoS-adaptive bandwidth scheduling in continuous media streaming"; Information and Software Technology; v.44n, Jun. 2002, p. 551-563.

Waddington, D.G., "Resource partitioning in general purpose operating systems; experimental results in Windows NT"; Operating Systems Review, vol. 33, No. 4, p. 52-74; ACM, Oct. 1999, USA.

Ditze, M. et al. "A method for real-time scheduling and admission control of MPE 2 streams; PART 2000; 7th Australian Conference on Parallel and Real-Time Systems", Nov. 2000, Sydney, NSW, Australia, Pub: Springer-Verlag, Hong Kong, China 2001.

Garofalakis, M., et al, "Competitive Online scheduling of continuous media streams", Journal of Computer and Systems Sciences; vol. 64, No. 2 p. 219-48, Academic Press, Mar. 2002 USA.

Wonjon, L. et al. ; "QoS-adaptive bandwidth scheduling in continuous media streaming" Dept of Computer Sci and Engr, Korea University, Seoul, South Korea; Information and Software Technology, vol. 44, No. 9, p. 551-53, Seoul, Korea.

Mourlas, C.; "Deterministic scheduling of CBR and VBR media flows on parallel media servers", Euro-Par 2002 Parallel Processing 8th Intn'l Euro-Par Conference Proceedings; vol. 2400, p. 807-15, Aug. 2002, Paderborn, Germany 2003.

Buford, J.F.; "Storage server requirements for delivery of hypermedia documents", Proceedings of the SPIE—The International Society for Optical Engineering Conference, Int. Soc. Opt. Eng. vol. 2417, p. 346-55, 1995.

Microsoft Computer Dictionary definiton of Function Call, Copyright 2002.

Pang, H. et al. "Resource scheduling in a high performance media server": IEEE Transactions on Knowledge and Data Engineering, v11n2, p. 303-320, 1999.

Notice of Allowance for U.S. Appl. No. 10/688,423; Date of Mailing: Feb. 22, 2010; 7 pgs.

Final Office Action for U.S. Appl. No. 10/538,334; Date of Mailing: Apr. 13, 2010; 20 pgs.

Monien et al., "Online scheduling of continuous media streams," Foundations of Computer Science Potential-Theory-Cognition Lecture Notes in Computer Science, 1997, vol. 1337, pp. 313 - 320.

Non-Final Office Action for U.S. Appl. No. 10/734,783; Date of Mailing: Aug. 14, 2007; 18 pgs.

Notice of Allowance and Interview Summary for U.S. Appl. No. 10/734,783; Date of Mailing: Jan. 16, 2008; 16 pgs.

Notice of Allowability for U.S. Appl. No. 10/734,783; Date of Mailing: Apr. 21, 2008; 3 pgs.

Notice of Allowance for U.S. Appl. No. 10/734,783; Date of Mailing: Apr. 30, 2008; 3 pgs.

International Search Report for PCT Application No. PCT/US2003/040102; Applicant: America Online Incorporated; Date of Mailing: Jun. 18, 2004; 4 pgs.

International Preliminary Examination Report for PCT Application No. PCT/US2003/040102; Applicant: America Online Incorporated; Date of Completion: Aug. 23, 2004; 3 pgs.

International Search Report for PCT Application No. PCT/US2003/039525; Applicant: America Online Incorporated; Date of Mailing: Dec. 6, 2004; 3 pgs.

Notice of Allowance, issued in U.S. Appl. No. 10/688,423, mailed Feb. 2, 2010.

Office Action, issued in U.S. Appl. No. 10/538,334, mailed Apr. 13, 2010.

Advisory Action, issued in U.S. Appl. No. 10/538,334, mailed Jun. 29, 2010.

Supplementary Search Report, issued in EP Patent Application No. 03813470.6, mailed May 28, 2010.

* cited by examiner

| Logging | | | |
|---|---|---|---|
| Level | Module | Description | Action |
| Info | Cache | Cache Thread Started | |
| Error | Cache | Error opening <filename> for writing on localdisk | |
| Error | Cache | Content Store too busy sleeping for 10 seconds | |
| Error | Cache | 6 errors getting file <filename> | |
| Error | Cache | Error Contacting Content Site (<host>:<port>), trying again in 30 Seconds | |
| Error | Client | Invalid SID requested | |
| Error | Client | Service full, disconnecting | |
| Info | Client | Starting stream (UID: <uid>)[L: <lid>] {A: <user_agent>}(SID: <sid>) | |
| Info | Client | Connection closed (N seconds) (UID: <uid>)[L: <lid>] {Bytes: <bytes sent>} | |
| Info | Client | Invalid resource request(<URLPATH>) | |
| Info | Client | REQ: <url> <user-agent of client> | |
| Info | Kick | IP:Port kicked | |
| Error | Main | failed to alloc (N) bytes for stream placeholder; ( no memory for the station configuration) | |

| Logging | | | |
|---|---|---|---|
| Level | Module | Description | Action |
| Info | Main | SSCD System SERV_OSNAME SERV_VER DATE) starting; startup info | |
| Info | Main | Pid: <pid> | |
| Info | Main | loaded config from <config filename> | |
| Info | Main | initializing (usermax portbase) | |
| Error | Main | GMTOffest not set in config file | |
| Info | Main | Listener Max Connect of (%d) Minutes, set | |
| Error | Main | failed to alloc (%d) bytes for clients | |
| Error | Main | failed to alloc (%d) bytes for admin html page; this error is unlikely | |
| Error | Main | error initializing winsock | |
| Info | Main | opening client socket | |
| Error | Main | error opening client socket - Fatal Error | |
| Info | Main | database thread starting…started | |
| Info | Main | cache thread starting….started | |
| Info | Main | Timer thread starting….started | |
| Info | Main | Playlist thread starting….started | |
| Info | Main | Source thread starting….started | |
| Info | Main | Client main thread starting….started | |
| Info | Main | Client stream thread <threadId> starting….started | |

| Logging | | | |
|---|---|---|---|
| Level | Module | Description | Action |
| Error | DB | ERROR: Contacting Database. Waiting 30 seconds to try again | |
| Info | DB | Connected to database: as user: with broadcaster id: and flavor id: | |
| Error | DB | ERROR: Getting Stream List from Database. Reconnect in 30 seconds\n"); | |
| Error | DB | ERROR: Populating initial playlists | |
| Error | DB | Could not find tracks for SID: <sid> | |
| Error | DB | ERROR: Adding more tracks | |
| Info | Playlist | read <playlist index> of <total entries available> | |
| Info | Signal | SIGHUP; Flushing Log Files | |
| Info | Signal | SIGTERM; exiting | |
| Info | Signal | SIGINT; exiting | |
| Info | Signal | SIGKILL; exiting | |
| Info | Signal | SIGHUP handled. lost terminal | |
| Info | Signal | SIGWINCH; Reloaded Config File | |
| Error | Source | Sid:<sid> Looping | |

Relevant Database Schema

```
CREATE TABLE STREAM (
        STREAM_ID         NUMBER(9)    NOT NULL,
        CHANNEL_ID        NUMBER(9)    NOT NULL,
        STREAM_CLASS          NUMBER(6)     NOT NULL,
        STREAM_TYPE       NUMBER(6)    NOT NULL,
        STREAM_UID        VARCHAR2(64) NOT NULL,
        AUTHBLOB          VARCHAR2(128),
        BITRATE               NUMBER(9)     NOT NULL,
        META_CLASS        NUMBER(6),
        META_TYPE         NUMBER(6),
        RAW_STREAM        NUMBER(1),
        RAW_BITRATE       NUMBER(9),
        UV_URL                VARCHAR2(256)
        CONSTRAINT PK_STREAM
        PRIMARY KEY (STREAM_ID))

CREATE TABLE BROADCAST_STREAM (
        STREAM_ID         NUMBER(9)    NOT NULL,
        BROADCASTER_ID           NUMBER(9) NOT NULL,
        STATUS_ID             NUMBER(6),
        CONSTRAINT PK_BRODCAST_STREAM
        PRIMARY KEY (STREAM_ID, BROADCASTER_ID))

CREATE TABLE BROADCAST (
        BROADCASTER_ID    NUMBER(6)    NOT NULL,
        BROADCASTER_DNS   VARCHAR2(40),
        CONSTRAINT PK_BROADCAST
        PRIMARY KEY (BROADCASTER_ID))

CREATE TABLE STATUS(
        STATUS_ID         NUMBER(6)    NOT NULL,
        STATUS_DESC       VARCHAR2(60) NOT NULL,
        CONSTRAINT PK_STATUS
        PRIMARY KEY (STATUS_ID))

CREATE TABLE  SONG_LOCATION (
        SONG_ID           NUMBER(9)    NOT NULL,
        STREAM_ID         NUMBER(9)    NOT NULL,
        AUDIO_LOCATION    VARCHAR2(60) NOT NULL,
        CONSTRAINT PK_SONG_LOCATION
   PRIMARY KEY (SONG_ID, STREAM_ID))
   CREATE TABLE BLADES(
   BLADE_ID               NUMBER(6) NOT NULL,
   BLADE_DNS              VARCHAR2(40) NOT NULL,
   PRIMARY KEY (BLADE_ID))
      alter table song_play add ( metadata varchar2(2000) )
```

STREAM SOURCING CONTENT DELIVERY SYSTEM

CROSS-REFERENCE TO RELATED APPLICATIONS

The present application claims priority to U.S. Provisional Application No. 60/433,734, entitled "MUSIC NET," filed Dec. 13, 2002.

FIELD OF THE INVENTION

The invention relates to the transfer, distribution, and play of streamed information or content in a network environment. More particularly, the invention relates to the creation of streamed and loopable content in a network environment.

BACKGROUND OF THE INVENTION

The Internet comprises a web of computers and networks, which are widely spread throughout the world. The Internet currently comprises millions of network connections, and is used by millions of people, such as for business, education, entertainment, and/or basic communication.

Digital content, such as sound recordings, e.g. songs, are often transferred across the Internet. In addition to the basic transfer of song files, numerous network enabled radio stations have been introduced, which provide content to listeners at computers across the Internet. Network enabled radio has significantly increased the magnitude and variety of content to recipients, as compared to conventional over-the-air radio broadcasts While there are numerous Internet radio stations currently in operation, there are many technological shortcomings in the delivery of digital content to listeners. For example, buffering between songs, i.e. tracks, and even during tracks, is a common occurrence, which commonly diminishes the quality of a broadcast for listeners. As well, a short or long duration failure across the network, e.g. a blackout, results in the cessation of a music presentation, further diminishing the user experience.

As well, current content delivery systems do not offer sufficient flexibility and/or scalability for future network architectures and increased market demands. As the number of Internet radio stations increases to meet consumer demand, and as the number and variety of content recipients, i.e. listeners, increases, it will be necessary to provide substantial improvements in content delivery architectures.

Pull vs. Push Mod Is for Content Delivery. In content delivery systems which operate on a push distribution model, a source complex makes an outbound connection to a distribution point, and pushes data to the distribution point at a rate determined by the source complex. However, in a content delivery system which operates on a push distribution model, broadcasters are required to be aware of the network architecture. Therefore, every time a distribution point is added, the broadcast configuration is required to change, to make an outbound connection to the new distribution point. As well, the implementation of fail over and/or load balancing logic typically requires that a push system frequently reconfigure both the distribution points and the broadcaster hosts.

A pull model typically requires less buffering logic than a push model for the broadcaster, because the broadcaster just sends data obliviously, i.e. the distribution point is required to receive the data and feed a local buffer appropriately. In a content delivery system which operates on a pull distribution model, a distribution point initiates the connection with a broadcaster, and requests a desired stream identifier.

Several structures and methods have been described for the distribution of content in a network environment.

N. Dwek, Multimedia Content Delivery System and Method, U.S. Pat. No. 6,248,946, describes "A system and method for delivering multimedia content to computers over a computer network, such as the Internet, includes a novel media player which may be downloaded onto a user's personal computer. The media player includes a user interface which allows a listener to search an online database of media selections and build a custom playlist of exactly the music selections desired by the listener. The multimedia content delivery system delivers advertisements which remain visible on a user's computer display screen at all times when the application is open, for example, while music selections are being delivered to the user. The advertisements are displayed in a window which always remains on a topmost level of windows on the user's computer display screen, even if the user is executing one or more other programs with the computer."

M. DeLorenzo, Multi-Room Entertainment System with In-Room Media Player, U.S. Pat. No.6,438,450, describes "A plurality of media data, including audio data or audio/video data, are stored in a central database. A plurality of in-room, user interface systems access the media data through a central server. The central server presents to the in-room system a selection menu through which at least one of the media data may be selected. Upon selection of a media data by the user interface, the central server accesses the selected media data from the central database and transmits it to the in-room system. The media data may be transmitted by downloading the data to an intermediate system, playing the media data at the intermediate system and outputting the played media data to the in-room system through a communications line. The media data may also be transmitted by streaming the media data to the in-room system through a communications line. The central server may present to the in-room system any of a number of additional menus including a purchase menu through which the selected media data may be purchased, an activation menu through which communication between the in-room system and the central server may be established for a period of time, a radio menu through which any of a plurality of programmed media-data channels may be accessed and a mood menu through which the brightness of the image displayed on the in-room system video monitor may be affected."

Other structures and methods have been described for the distribution of content in a network environment, such as: Streaming Information Providing Method, European STREAM SOURCING CONTENT DELIVERY SYSTEM patent application Ser. No. 1187 423; O. Hodson, C. Perkins, and V. Hardman, Skew Detection and Compensation for Internet Audio Applications; 2000 IEEE International Conference on Multimedia and Expo; 2000; C. Aurrecoechea, A. Campbell, and Linda Hauw, A Survey of Qos Architectures, Center for Telecommunication Research, Columbia University; S. Cen, C. Pu, R. Staehli, and J. Walpole, A Distributed Real-Time MPEG Video Audio Player, Oregon Graduate Institute of Science and Technology; N. Manouselis, P. Karampiperis, I. Vardiambasis, and A. Maras, Digital Audio Broadcasting Systems under a Qos Perspective, Telecommunications Laboratory, Technical University of Crete; Helix Universal Gateway Configuration Guide, RealNetworks Technical Blueprint Series; Jul. 21, 2002; Helix Universal Server from RealNetworks Helix Universal Gateway Helix Universal Server, www.realnetworks.com; Media Delivery and Windows Media Services 9 Series.

Other systems describe various details of audio distribution, streaming, and/or the transfer of content in a network environment, such as G. France and S. Lee, Method for Streaming Transmission of Compressed Music, U.S. Pat. No. 5,734,119; D. Marks, Group Communications Multiplexing System, U.S. Pat. No. 5,956,491; M. Abecassis, Integration of Music From a Personal Library with Real-Time Information, U.S. Pat. No. 6,192,340; J. Logan, D. Goessling, and C. Call, Audio Program Player Including a Dynamic Program Selection Controller, U.S. Pat. No. 6,199,076; E. Sitnik, Multichannel Audio Distribution System Having Portable Receivers, U.S. Pat. No. 6,300,880; M. Bowman-Amuah, Method For Providing Communication Services Over a Computer Network System, U.S. Pat. No. 6,332,163; H. Ando, S. Ito, H. Takahashi, H. Unno, and H. Sogabe, Information Recording Device and A Method of Recording Information by Setting the Recording Area Based on Contiguous Data Area, U.S. Pat. No. 6,530,037; P. Hunt and M. Bright, Method and Apparatus for Intelligent and Automatic Preference Detection of Media Content, U.S. Patent Application Publication No. U.S. Pat. No. 2002 0078056; G. Beyda and K. Balasubramanian, Hybrid Network Based Advertising System and Method, U.S. Patent Application Publication No. U.S. Pat. No. 2002 0082914; System and Method for Delivering Plural Advertisement Information on a Data Network, International Publication No. WO 02/063414; Method for Recording and/or Reproducing Data on/from Recording/Recorded Medium, Reproducing Apparatus, Recording Medium, Method for Recognizing Recording/Recorded Medium, and Method for Recording and/or Reproducing Data for Apparatus Using Recording/Recorded Medium, European Patent Application No. EP 1 178 487; Method and System for Securely Distributing Computer Software Products, European Patent Application No. EP 1 229 476; Information Transmission System, Information Transmission Method, Computer Program Storage Medium Where Information Transmission Program is Stored, European Patent Application No. EP 1 244 021; Digital Content Publication, European Patent Application No. EP 1 267 247; File and Content Management, European Patent Application No. EP 1 286 351; S. Takao; Y. Kiyoshi; W. Kazuhiro; E. Kohei. Packet Synchronization Recovery Circuit; Section: E, Section No. 1225, Vol. 16, No. 294, Pg. 120; Jun. 29, 1992; R. Sion, A. Elmagarmid, S. Prabhakar, and A. Rezgui, Challenges in Designing a Qos Aware Media Repository, Purdue University; Z. Chen, S. Tan, R. Campbell, and Y. Li, Real Time Video and Audio in the World Wide Web, University of Illinois at Urbana-Champaign; Content Networking with the Helix Platform, RealNetworks White Paper Series; Jul. 21, 2002; C. Hess, Media Streaming Protocol: An Adaptive Protocol for the Delivery of Audio and Video over the Internet, University of Illinois at Urbana-Champaign, 1998; R. Koster, Design of a Multimedia Player with Advanced Qos Control, Oregon Graduate Institute of Science and Technology, Jan. 1997; C. Poellabauer and K. Schwan, Coordinated CPU and Event Scheduling for Distributed Multimedia Applications, College of Computing Georgia Institute of Technology, R. West, Computing Science Department Boston University; and Windows Media.

While some content delivery technologies describe the delivery of streamed content across a network, existing systems do not adequately provide a seamless delivery to a large number of recipients, nor do such technologies provide a "fail safe" seamless playback of content upon failure across the network.

It would be advantageous to provide a system and an associated method which provides a seamless delivery of songs to a large number of recipients, which provides a "fail safe" seamless playback of content upon failure across the network. The development of such a content delivery system would constitute a major technological advance.

It would also be advantageous to provide a system and an associated method which provides delivery of content as well as metadata to multiple distribution points, and has the capability of broadcasting content indefinitely, even if a database or content store fails. The development of such a content delivery system would constitute a major technological advance.

SUMMARY OF THE INVENTION

The stream sourcing content delivery system goes to a database and builds a physical stream, based on a schedule. The stream source content delivery system works at a station ID (SID), finds the order of the delivery of content for the station based upon the schedule, and downloads a plurality of music files, e.g. 6 hours of music, to its hard drive to enable play back. The system then concatenates the files, to create a stream, and awaits the request of one or more stream recipients. Some preferred system embodiments further comprise a fail-safe mode, whereby a loop of music is generated from the downloaded stream, and is delivered to one or more users when further access to content is interrupted, such that recipients experience an uninterrupted delivery of a plurality of files, e.g. songs. A stream source content delivery system provides flexibility and scalability for large number of stations, e.g. up to 100 stations, and/or listeners.

BRIEF DESCRIPTION OF THE DRAWINGS

FIG. 9 is a first chart of system logging for a stream source content delivery system;

FIG. 10 is a second chart of system logging for a stream source content delivery system;

FIG. 11 is a third chart of system logging for a stream source content delivery system; and FIG. 12 shows database schema for a stream source content delivery system.

DETAILED DESCRIPTION OF PREFERRED EMBODIMENTS

Figure 1:
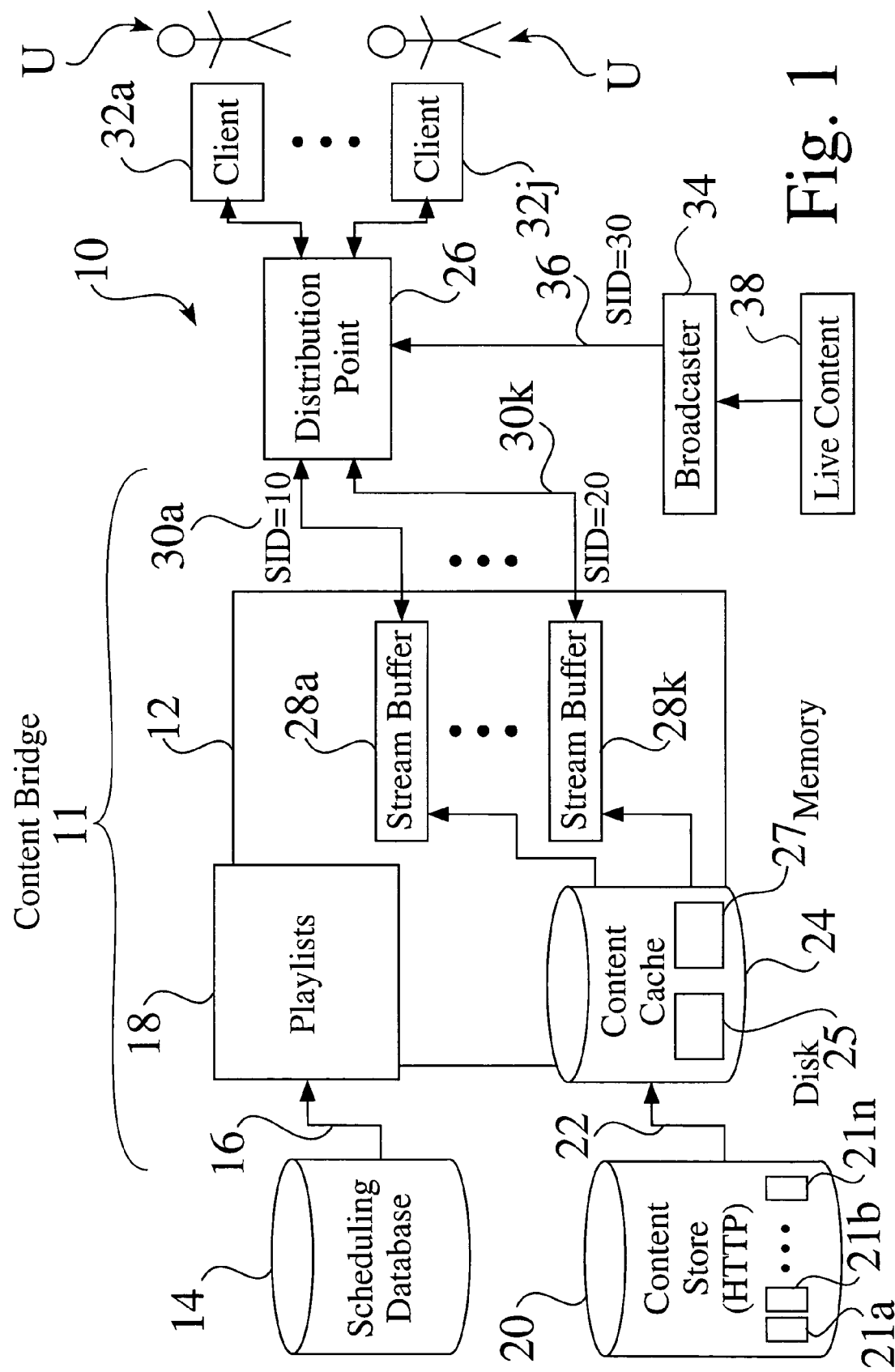
FIG. 1 is a schematic view of a stream source content delivery system between a scheduling system, a content storage system, and a distribution point.

FIG. 1 is a schematic view 10 of a stream source content delivery (SSCD) system 12, which acts as a bridge 11 between a scheduling system or database 14, a content storage system 20, and a distribution point 26.

Figure 8:
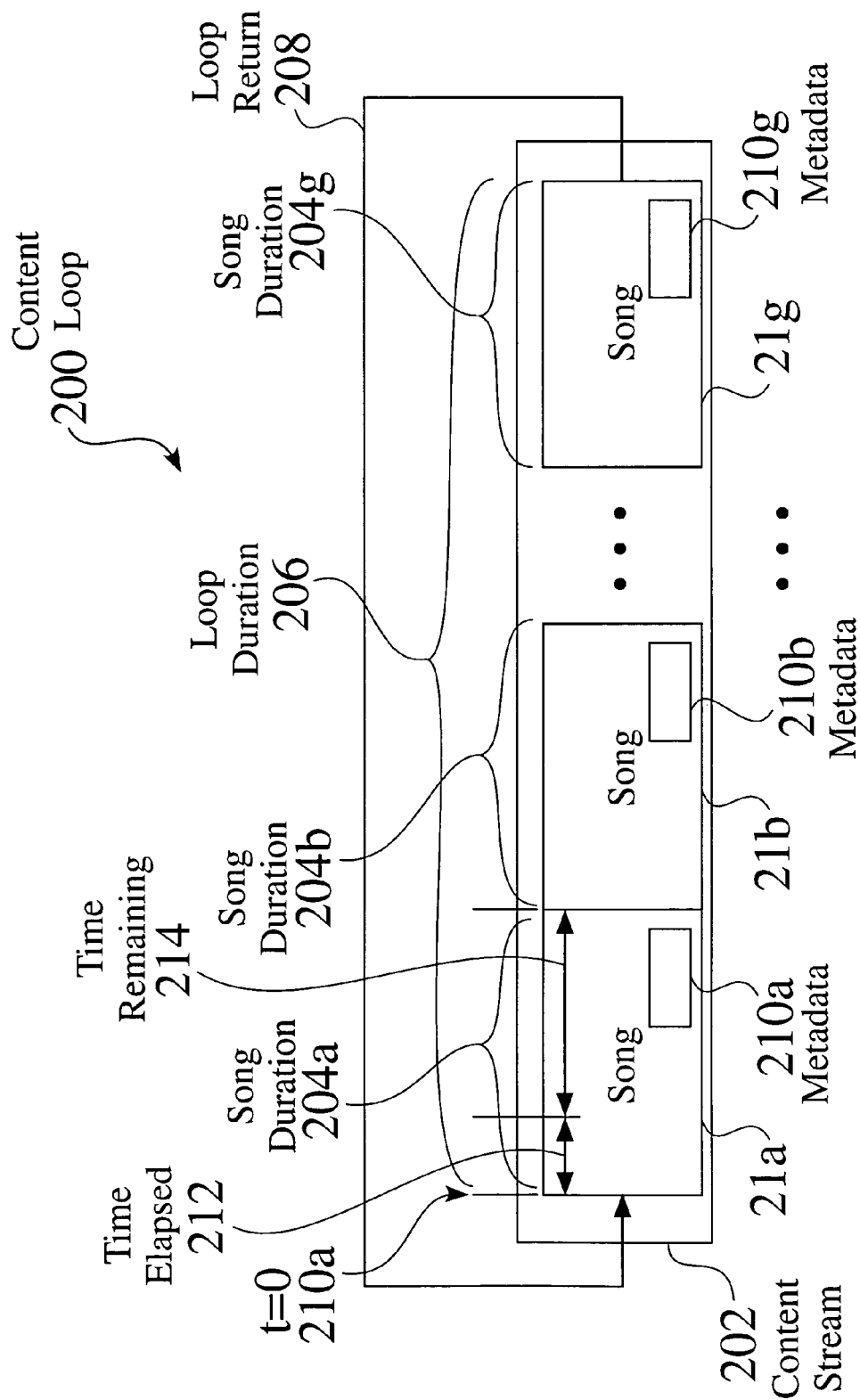
FIG. 8 is a schematic diagram of looped content.

A stream source content delivery system 12 fetches 22 songs 21, e.g. 21*a*-21*n*, from a content store 20 and stores them on a local disk 25 to be played by the user U. The system 12 loads these songs 21 into a memory 27, and streams the songs 21. It is sometimes the case that access to the content store 20 is lost. If a connection is lost between the stream sourcing content delivery server 12 and the content store 20 or local disk 25, the system 12 preferably goes into a looping behavior 200 (FIG. 8), whereby the user's experience is uninterrupted. The looping behavior 200 avoids blackouts for the user, i.e. the loop 200 is of sufficient length 206 (FIG. 8) that the loop 200 is typically not noticeable, and is preferably DMCA compliant.

The stream sourcing content delivery system 12 fetches songs 21, e.g. 21*a*-21*n*, from a content store 20 and stores them on a local disk 25, to be played for a user U at a client terminal or computer 32, e.g. 32*a* in FIG. 1. Client terminals or computers 32 typically comprise personal computers, mobile devices, and other microprocessor-based devices, such as portable digital assistants or network enabled cell phones. However, the apparatus and techniques can be implemented for a wide variety of electronic devices and systems, or any combination thereof, as desired.

It is sometimes the case that access to the content store 20 is lost. The stream sourcing content delivery system 12 loads these songs 21 into memory 27 and streams them to listeners 32. If a connection is lost between the stream sourcing content delivery system 12 and the content store 20 or local disk 25, the system 12 goes into a looping behavior 200 (FIG. 8), and the users experience is uninterrupted. The preferred looping behavior 200 avoids a blackout of content delivery to the user, and is typically compliant to the Digital Millennium Copyright Act (DMCA) standards. By contrast, in the prior art, no such avoidance of blackout is provided, and in the case of a lost connection, a user experiences a lockup.

Some preferred embodiments of the stream sourcing content delivery system 12 provide, on a per file basis, an adjustable bit rate at which a stream 28 is sent 190,192 (FIG. 7), to avoid over running or under running at the receiving end of the stream 28. This avoids a situation where timing errors can accumulate and result in interruptions or glitches in the delivery of music 21.

Some preferred embodiments of the stream sourcing content delivery system 12 also preferably provide the insertion of metadata 210 (FIG. 8) into a stream 28, to create song boundaries and to associate information with songs 21.

Some system embodiments 12 act as a component of a streaming architecture, such as for a Radio@ streaming architecture, available through Radio@AOL. The stream sourcing content delivery system 12 delivers a formatted stream 28, to a distribution point 26, based on a content store 26 and a scheduling database 14.

From the high level view, the stream sourcing content delivery system 12 fetches playlists 18 from a database 15 for each station 30, e.g. 30*a*, that the system 12 serves. The system 12 analyzes the playlists 18, locally caches 24 the content 21*a*-21*n* for each station 30, and sets up a listen thread, i.e. stream 28. A distribution point 26 can then connect to the stream sourcing content delivery system 12, and relay the data stream 28, typically corresponding to a relay protocol.

The stream sourcing content delivery system 12 shown in FIG. 1 manages the retrieval 16 and caching of the playlists 18 from the scheduling database 14, manages content 21 on the local disk 25 and in memory 27, and relays content 21 to distribution points 26, during normal operation and various failure conditions.

The stream sourcing content delivery system 12 typically logs the status of the system operation and hardware, such that operations personnel can properly manage the stream sourcing system hardware 12.

Some preferred embodiments of stream sourcing content delivery system 12 comprehensively control the content 20, the source complex, the distribution point 26, the transport, and the clients 32*a*-32*j*, to provide integrated flexibility and control over how content 21*a*-21*n* is delivered to users U, to ensure both that the user experience is maximized, and that system improvements and upgrades are readily implemented.

In addition to improving the backend architecture of content delivery, the stream sourcing content delivery system 12 improves user experience. For example, some preferred embodiments of the stream sourcing content delivery system 12 do not require buffering between tracks. Users do not have to wait to buffer between songs 21 on the same stations 30. Instead, there is typically a short buffering period when a user tunes into a station 30. While the user listens to a station 30, the user does not experience any buffering, unless the user has an abnormally bad network condition.

As well, some embodiments of the stream sourcing content delivery system 12 provide reduced network congestion, through the use of matched data transmission, e.g. 14 kbps codec, and through the minimization of data overhead, which improves the delivery to data to a client 32, i.e. it is less likely that a client 32 is not able to receive the necessary data for a given time slice. The stream sourcing content delivery system 12 reduces a need to rebuffer in the middle of a song 21 due to network congestion, which further provides an improved user experience.

The distribution point 26 shown in FIG. 1, which receives content streams 28, e.g. 28*a*-28*k*, from the stream sourcing content delivery system 12, may additionally receive content 38, e.g. live content 38, from a broadcaster 34, such as through a broadcast feed 36, e.g. SID=30.

Figure 2:
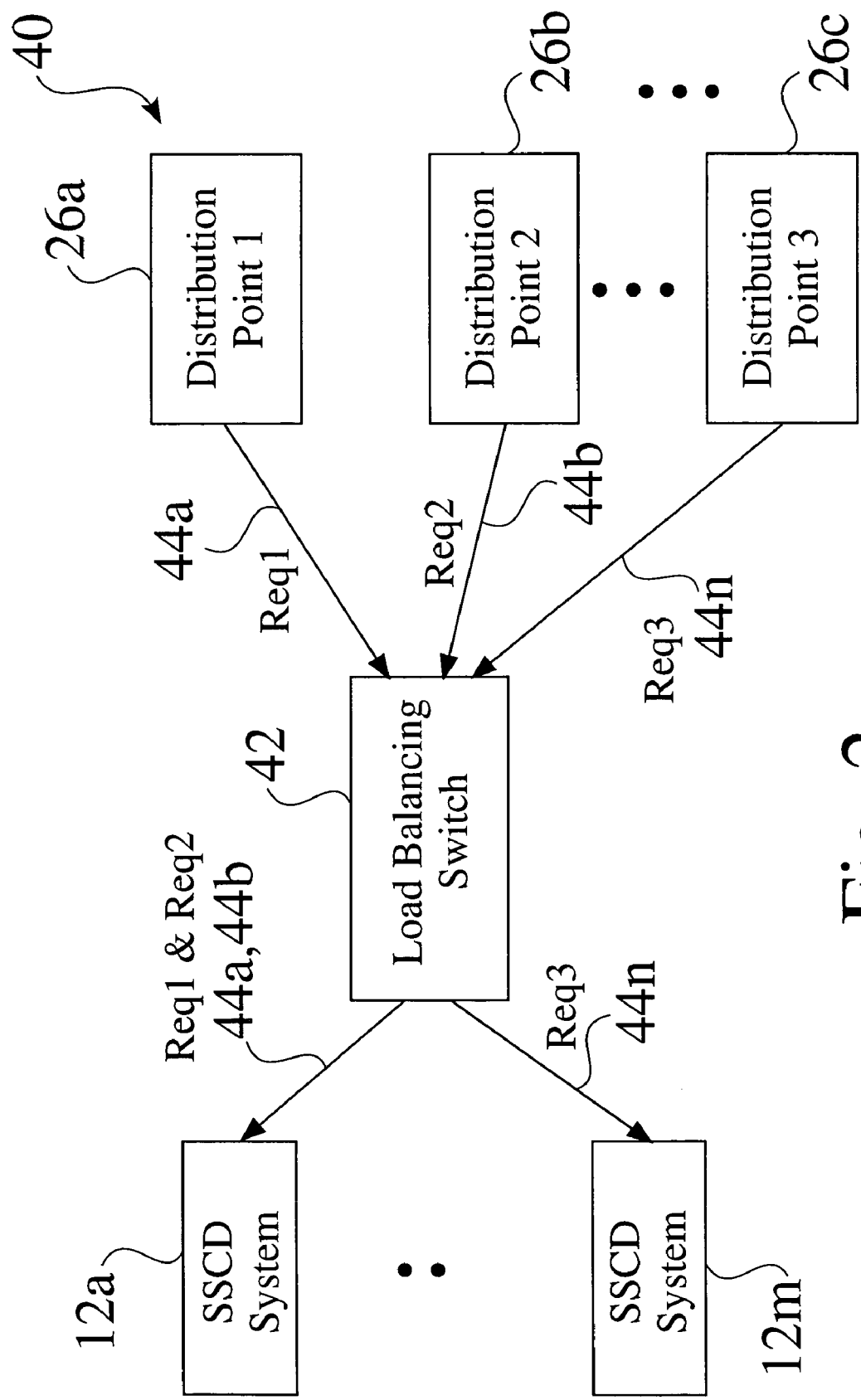
FIG. 2 is a schematic diagram of stream source content delivery systems implemented within a pull model load balancing distribution environment.

FIG. 2 is a schematic diagram of stream sourcing content delivery systems 12*a*-12*m* implemented within a load balanced pull model distribution environment 40. Content delivery systems are typically configured to operate within either a push model architecture or a pull model architecture. In a push model system architecture, the system 12 makes an outbound connection to a distribution point 26, and "pushes" data, e.g. songs 21, to the distribution point 26, at any rate that is acceptable the system 12. A push model architecture requires less logic in the broadcaster 34 to deal with buffering, since the rate of the transmission of data 21 is not limited to external conditions, i.e. it is up to the distribution point 26 to receive the data 21*a*-21*n*, and feed its own buffer appropriately.

However, the downside of a push model architecture is that broadcasters 34 must be aware of the network architecture, such as the number and locations of distribution points 26. Therefore, each time a distribution point 26 is added, the broadcast configuration is required to change, to make outbound connections to the new distribution point 26. Furthermore, a push model architecture which includes fail over and/or load balancing becomes even more complex, and requires frequent reconfiguration of both the distribution points 28 and the broadcaster hosts 12.

The stream sourcing content delivery system 12*a* shown in FIG. 2 comprises a load-balanced "pull" model architecture 40, in which a distribution point 26, e.g. 26*a*, initiates a connection with stream sourcing content delivery system 12, e.g. 12*a*, and requests the stream ID 30 that the distribution point 26 is interested in relaying to one or more clients 32. Each stream sourcing content delivery system 12 in FIG. 2, e.g. 12*a*, can accept multiple connections 30 (FIG. 1), and begins feeding data for any stream 28 that it is configured for. Therefore, the source complex 12 in the stream sourcing content delivery system 12*a* does not have to be aware of the network architecture. Instead, the source complex 12 only needs to be aware of the streams 30 that it is configured to serve.

In the "pull" model architecture 40, it is the responsibility of operations personnel to craft the network architecture as needed, whereby the majority of the network architecture is controlled by the distribution points 26.

As seen in FIG. 2, a load-balancing switch 42 in preferably located front of the stream sourcing content delivery hosts 12, such that inbound connections from the distribution points 26 are automatically dispersed among the stream sourcing content delivery hosts 12. The addition of distribution points 26 and load balancing 42 is readily achieved in the load-balanced "pull" model architecture 40 shown in FIG. 2.

The stream sourcing content delivery system 12*a* shown in FIG. 2 comprises a pull model, to simplify the responsibilities of system operations. The stream sourcing content delivery system 12*a* has been tested using a SHOUTCAST™ complex, available through NullSoft, Inc., to readily provide controlled broadcast and distribution functions.

Song Selection Models—"Plan Ahead" vs. "Just In Time" Song Selection. The stream sourcing content delivery system 12 can be configured for a wide variety of song selection models, such as "Just in Time" song selection, or "Plan Ahead" song selection.

A "Just-in-Time" song selection model requires that the song selection process verify the existence of the file 21 on disk just before it is ready to be played. In some "Just-in-Time" song selection model embodiments, tracks are typically scheduled three tracks in advance. Some embodiments of the stream sourcing content delivery system 12 comprise Just-in-Time song selection, such as to decrease the chance of violating DMCA rules, and/or to maximize the chance that content 21 is available on the system disk 25.

Since song verification and access can be an intensive and time-sensitive process, which can be disrupted with the failure of multiple parts of the system, some system embodiments 12 preferably comprise a "Plan Ahead" song selection model, in which song tracks 21 for each station 30 are scheduled far in advance, and in which the local content cache 24 is populated with an extended playlist 18 of songs 21. A "Plan Ahead" song selection model gives the broadcaster 34 an opportunity to plan ahead and pre-fetch the tracks 21 that the system 12 needs for the foreseeable future. A "Plan Ahead" song selection model also allows the caching of content 21 on the system 12, so that in the event of a failure of the database 14 and content store 20, the system 12 has sufficient content 21 to loop 200 (FIG. 8) on a DMCA compliant playlist 18.

System Performance and Scalability. The operating system of the stream sourcing content delivery system 12 manages the retrieval of schedules playlists 18 and content 21, the production of content streams 28, and the loop 200 of content as needed. Therefore, the system input and output (IO) hardware, comprising the network 11 and disk 25, is not the limiting factor in the performance of the system 12, since the performance of the stream sourcing content delivery system 12 is not limited by the overhead of the process. Therefore, the stream sourcing content delivery system 12 is readily scaled to meet the needs of a large number of streams per host, e.g. as much as 150 or more streams per host system 12, and/or as many as or more than 500 listeners or relays per host system 12.

While the stream sourcing content delivery system 12, is readily adapted for a wide variety of operating environments, current system embodiments typically comprise the following features:

The system 12 schedules songs several tracks into the future, i.e. plan-ahead.

The system 12 assumes that track time in the database 14 is correct.

The system 12 assumes that the bit rate of each clip in the database 14 is correct and precise.

Content 21 is either available via http, or is pre-loaded onto the local disk

The schema of the system 12 preferably matches the database schema

The metadata in database is currently less than or equal to 4000 bytes

Figure 3:
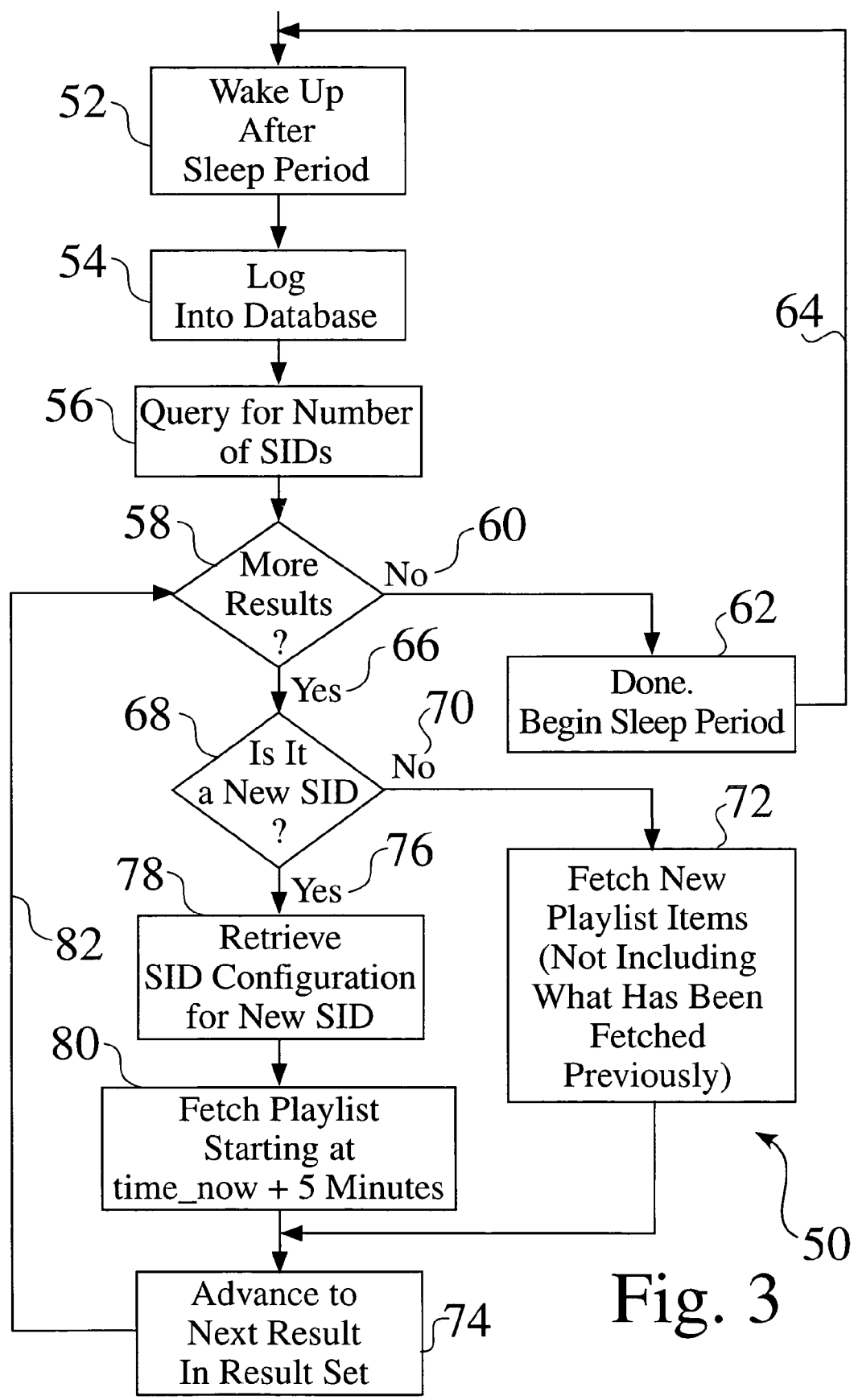
FIG. 3 is a flowchart of periodic playlist retrieval within the stream source content delivery system.

Database Management. FIG. 3 is a flowchart of periodic playlist retrieval 50 within the stream sourcing content delivery system 12. The system 12 typically communicates with the database 14, e.g. such as an Oracle database 14, through a database thread.

The system 12 periodically wakes up 52, e.g. such as every five minutes. Upon waking 52, the system 12 logs 54 into the database 14, such as within a user/password/database format, e.g. via a PRO*C daemon.

The stream sourcing content delivery system 12 then performs a query 56 of how many total streams 28 that the system 12 is required to source, in order to allocate memory for the stream structures 28. The system 12 queries 56 the database 14 for the current number of station identities (SIDs) 30, and determines 58 if there are more results. Once the number of streams 28 has been determined, the stream sourcing content delivery system 12 allocates the appropriate space, and continues.

If there are no more results 60, the process 50 is finished for that period, and begins 62 another sleep period, and then returns 64 to wake up 52. If there are 66 more results, a determination 68 is made whether the result is a new SID 30, at step 68. If the SID determination 68 is negative 70, i.e. the results are not a new SID 30, the new playlist items are fetched 72, not including what has been previously fetched. If the SID determination 68 is positive 76, i.e. the results correspond a new SID 30, the SID configuration for the new SID 30 is retrieved 78, and the playlist 18 is fetched 80, typically starting at the current time and extending for a time period, e.g. 5 minutes. The system 12 advances 74 to the next result in the result set, and returns to the result step 58, to repeatedly process any other results, before sleeping 62.

As seen in FIG. 3, the stream sourcing content delivery system 12 performs the periodic playlist retrieval process 50 after each sleep period, e.g. every 5 minutes.

Retrieval of Stream Configurations. The stream sourcing content delivery system 12 then retrieves the details for each stream 28 it will source. The system 12 compares the result set to the list of streams 28 it currently has, and adds any new streams 28 to the list.

Retrieval of Playlists. For each stream configuration received in the previous step, the database thread queries the database 14, and retrieves the corresponding playlist 18 for the stream 28. The system 12 marks each playlist item 21 as "Not Cached".

Figure 4:
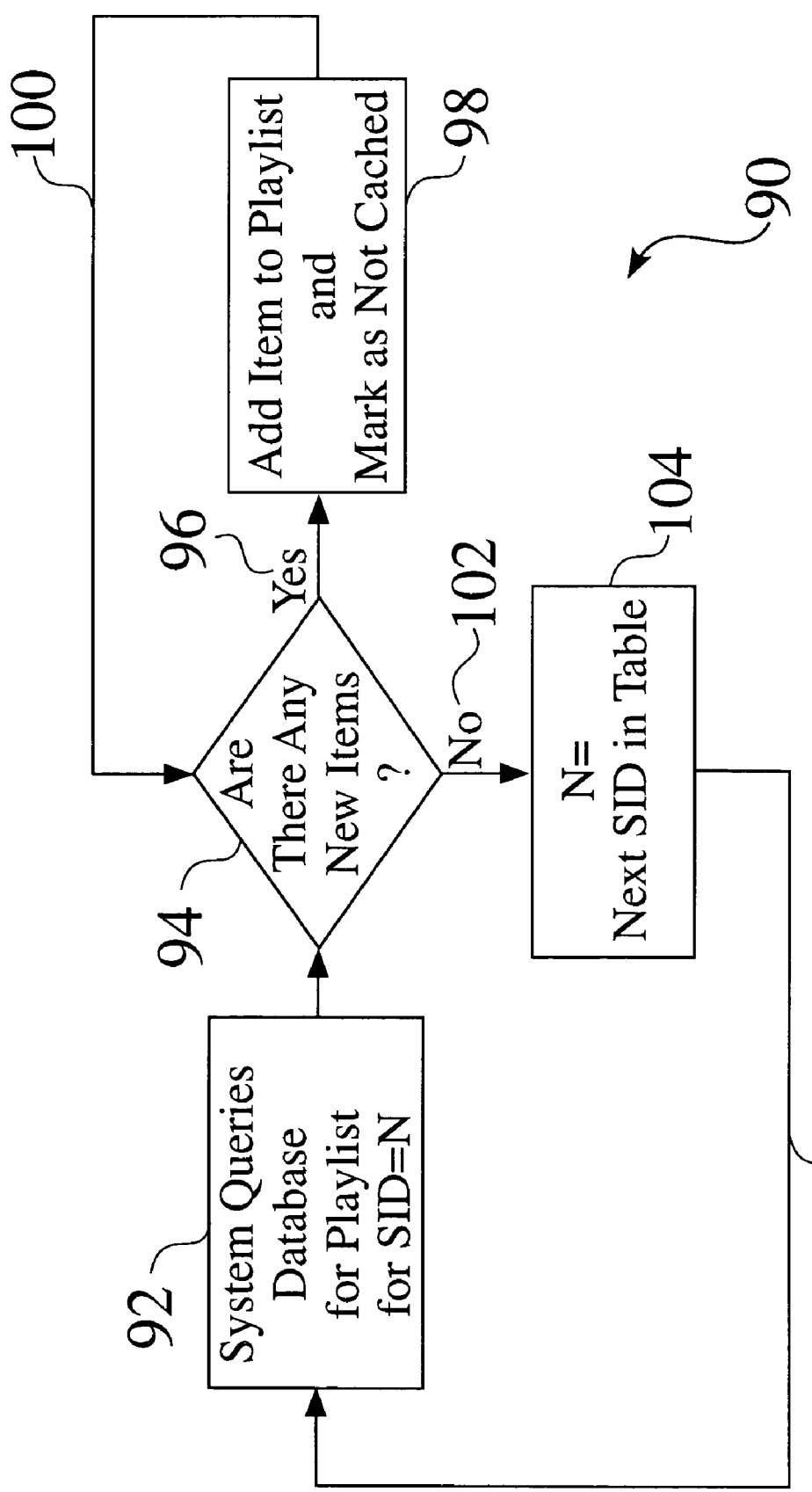
FIG. 4 is a flowchart of periodic playlist management within the stream source content delivery system.

Playlist Management. FIG. 4 is a flowchart of periodic playlist management 90 within the stream sourcing content delivery system 12, which illustrates normal operation for fetching new tracks. Under normal operation, the stream sourcing content delivery system 12 queries 94 the database 14 and see if there are new tracks for the playlist for the given SID. The system 12 asks the database 14 if there are new tracks scheduled since the last time the stream sourcing content delivery system 12 retrieved this information (using a time and ID). If the determination is positive 96, i.e. there are new items, the stream sourcing content delivery system adds 98 the information for each item to the playlist 18, and returns 100 to the determination step 94. If the determination is negative 102, i.e. there are no new items, the periodic playlist management process 90 proceeds 104 to the next station ID 30, queries the database 14 for the playlist 18 of the next station ID 30, and then determines 94 if there are new tracks for the playlist 18 for the next SID 30.

The periodic playlist management process 90 is therefore repeated for each station ID 30. The periodic playlist management process 90 guarantees that the stream sourcing content delivery system 12 has the maximum schedule for each station 30, such that the system has the greatest chance to fetch the content 21 and to prepare the content stream 28.

Content Management. The stream sourcing content delivery system 12 preferably caches content as far in the future as possible. The stream sourcing content delivery system 12 uses two types of cache management, disk cache management, and memory cache management. As well, the stream sourcing content delivery system 12 typically manages the removal of the content.

Figure 5:
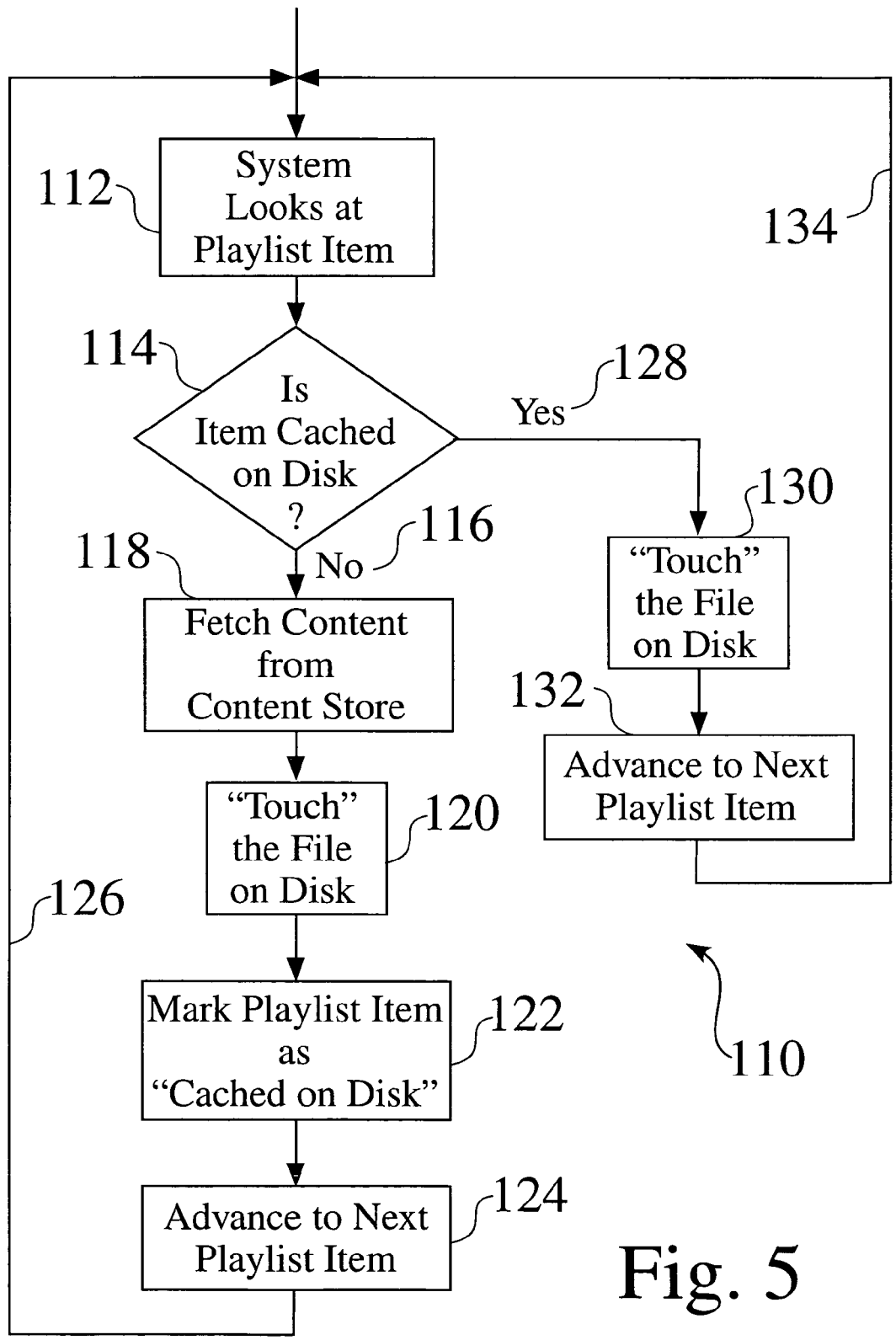
FIG. 5 is a flowchart of content cache marking within the stream source content delivery system.

Caching On Disk. FIG. 5 is a flowchart of an exemplary content cache marking process 110 within a stream sourcing content delivery system 12. The system 12 looks 112 at a playlist item 21, and determines 114 if the playlist item 21 is cached on the disk 25.

If the determination is positive 128, e.g. the content is already cached on disk 25 from another station 30, the system 12 touches 130 the file on the disk 25, i.e. the system finds the content on disk 25, and marks the playlist item as cached. The system 12 then advances 132 to the next playlist item 21, and returns 134 to repeat the process, at step 112.

If the cache determination is negative 116, e.g. the content is not already cached on disk 25 from another station 30, the system fetches 118 the content 21 from the content store 20, touches 120 the file on the disk 25, and marks 122 the playlist item as cached on the disk 25. The system 12 then advances 124 to the next playlist item 21, and returns 126 to repeat the process, at step 112.

The stream sourcing content delivery system 12 periodically analyzes the items 21 in the playlist 18 for each stream 18. If the system 12 sees an item in the playlist 18 that hasn't been marked as cached, the system 12 attempts to cache the content 21. Before the system 12 caches the content 21, the system 12 checks to see if the content 21 is already on disk 25, i.e. the content 21 may already be cached on disk from another station 30. If the system 12 finds the content 21 on disk 25, the system 12 marks the playlist entry as cached. Otherwise, the system 12 fetches the content 21, such as by using a corresponding URL from the database 14 to fetch the content 21 via HTTP. The system 12 then marks the content 21 cached on disk 25.

Figure 6:
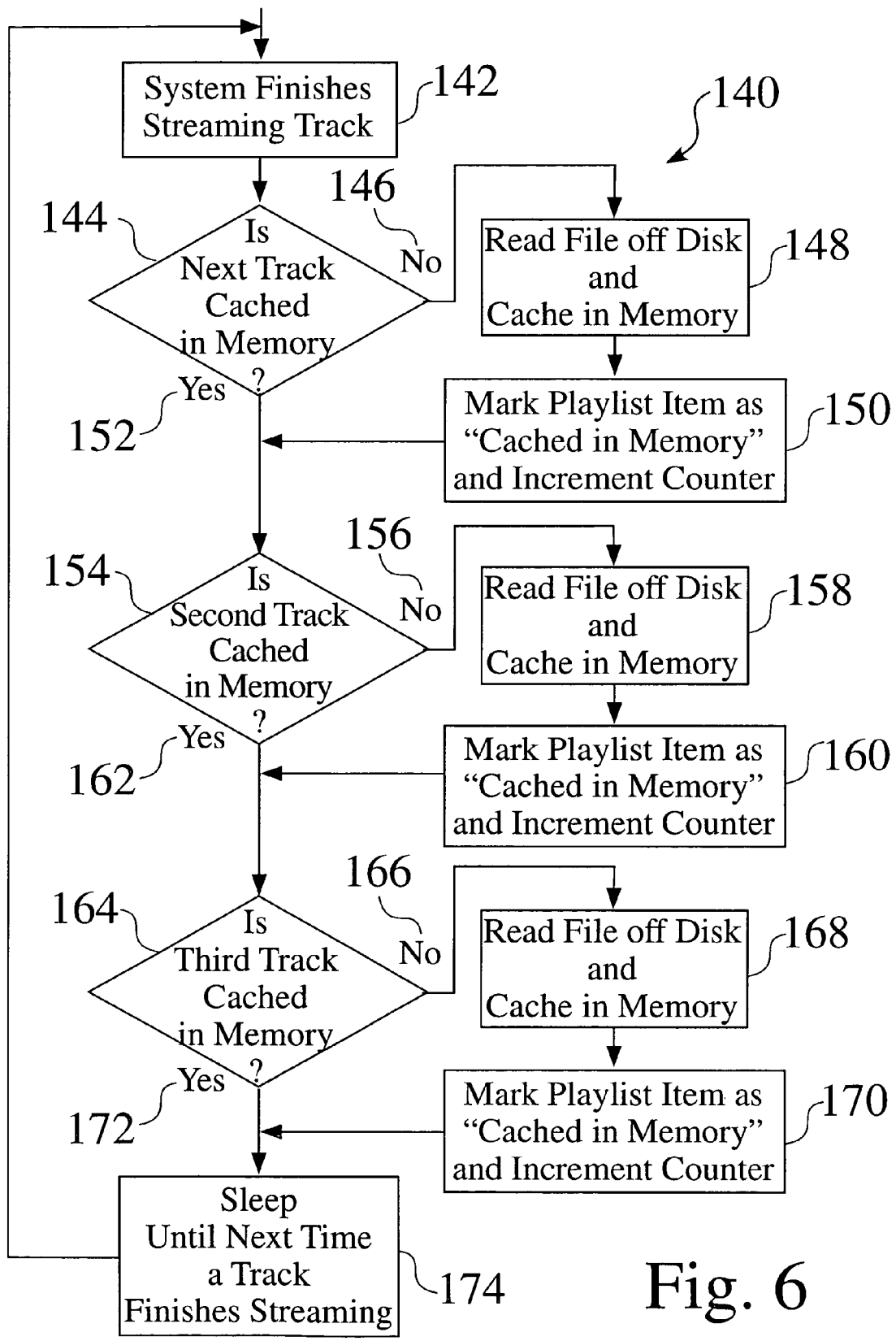
FIG. 6 is a flowchart of content cache in memory within the stream source content delivery system.

Caching in Memory. FIG. 6 is a flowchart of content caching in memory within a stream sourcing content delivery system 12. The stream sourcing content delivery system 12 not only caches content 21 on disk 25, but also caches content 21 in memory 27, shortly before the content 21 plays. Each time a track 21 finishes streaming, the stream sourcing content delivery system 12 typically looks ahead at the next two tracks 21 that it will stream. The system 12 then checks to see if these tracks 21 are in memory 27. If such a track 21 is not in memory 27, the system 12 reads the track 21 off of disk 25 into memory 27. Therefore, at any given time, there are typically two tracks 21 per station 30 cached in memory 27 waiting to be streamed, which reduces the load on the system 12 when the data is sent.

As seen in FIG. 6, when the system finishes 142 streaming a track 21, a determination 144 is made whether the next track is cached in memory 27. If the determination 152 is positive 152, the system 12 proceeds to analyze 154 the next track 21, while incrementing a counter. If the determination 152 is negative 146, the system 12 reads 148 the file off the disk 25 and caches to memory 27, while incrementing a counter.

At step 154, a determination is made whether the second track to be played 21 is cached in memory 27. If the determination 154 is positive 162, the system 12 proceeds to analyze 154 the third track 21. If the determination 154 is negative 156, the system 12 reads 158 the file off the disk 25 and caches to memory 27, while incrementing the counter.

At step 164, a determination is made whether the third track to be played 21 is cached in memory 27. If the determination 164 is positive 162, the system 12 sleeps 174 until the next track 21 finishes streaming. If the determination 154 is negative 166, the system 12 reads 168 the file off the disk 25 and caches to memory 27, while incrementing the counter.

Removing Content from Disk. The removal of content 21 from disk 25 is left to operations to manage. Since the stream sourcing content delivery system 12 does a system "touch" 120,130 (FIG. 5) on a file 21 when the system 12 anticipates using the file 21, the identification of stale content 21 is readily performed. In some embodiments of the stream sourcing content delivery system 12, a chronological content removal process, i.e. a "cron" job, is performed periodically, e.g. once every hour, in which any content 21 that is older than a specified time, e.g. 6-12 hours old, is removed.

Removing Content from Memory. When the stream sourcing content delivery system 12 finishes streaming a file, the system 12 frees the memory 27 for the track 21. Content 21 is typically cached in memory 27 uniquely for each stream 28. Therefore, there can be an overlap of content 21 between streams 28 in the stream sourcing content delivery system 12.

Figure 7:
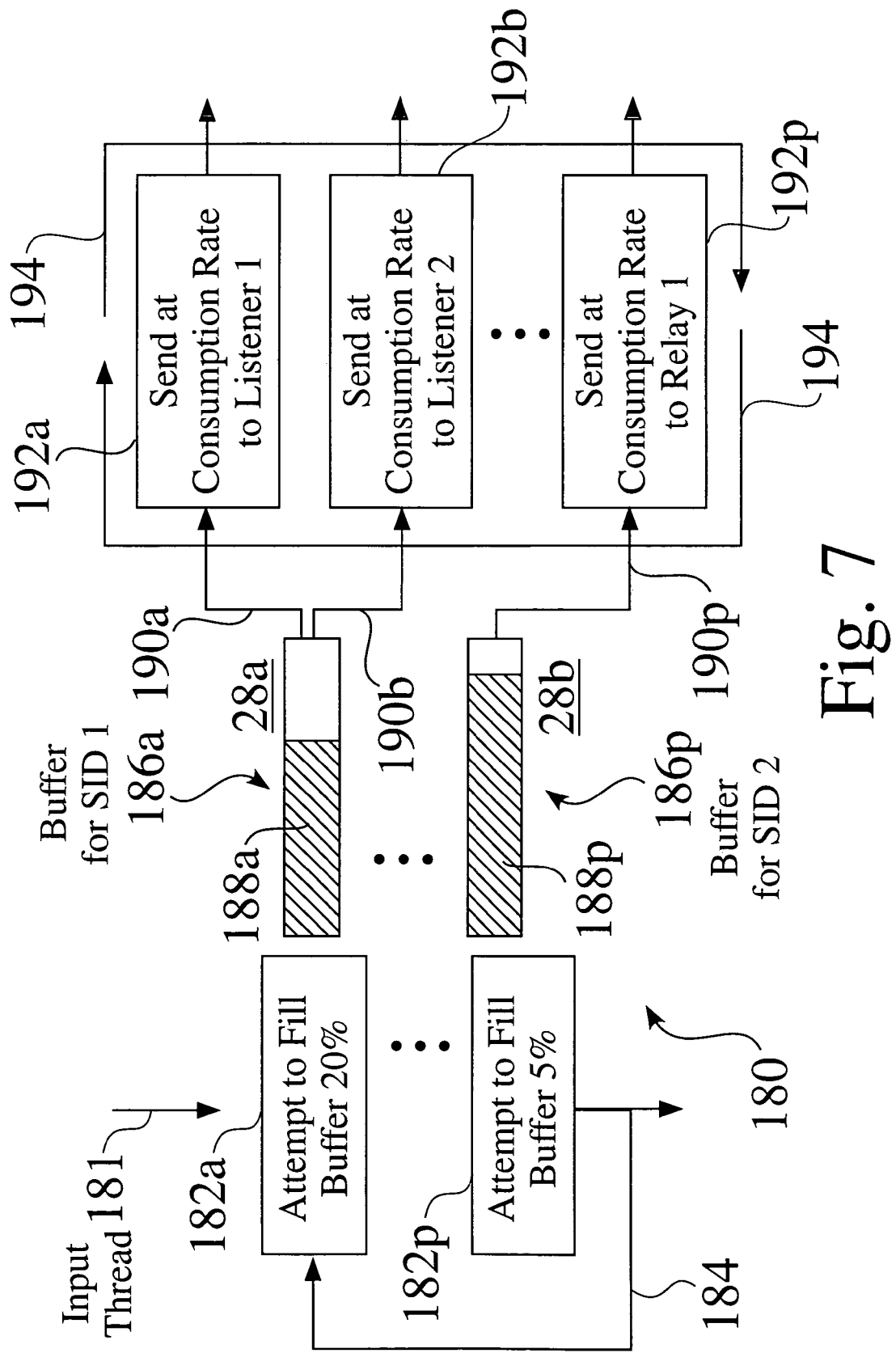
FIG. 7 is a schematic diagram of content stream management within the stream source content delivery system.

Stream Management. FIG. 7 is a schematic diagram of content stream management within a stream sourcing content delivery system 12. The stream sourcing content delivery stream management functions similarly to "producer consumer" model.

As seen in FIG. 7, there is a buffer 186, e.g. 186*a* for each stream 28, e.g. 28*a*, that is required to receive new content 21, to remain as full 188 as possible. The input thread 181 attempts 182*a*-182*p* to fill 188 each of the buffers 186*a*-186*p*, such as through a loop process 184. At the same time, there is a thread 190, e.g. 190*a* that is sending data from the buffer 186 to connected listeners/relays 192*a*-192*p*, such as through loop 194, preferably at the bit rate for each stream 28. . There is typically a single thread 181 which feeds all of the buffers 186 from the files 21 cached in memory 27, and one thread 190 per system 12 CPU which sends data from the buffer 186 to receivers 192, e.g. 192*a*.

Starting the Stream. When a stream 28 first starts, unless the system 12 is in a failure condition, the stream sourcing content delivery system 12 attempts to start playing the next track 21 at the scheduled start time for the track 21. This ensures that multiple stream sourcing content delivery instances 12 are synchronized, both with other stream sourcing content delivery instances 12, and with and database 14.

Stream Format. Data is read from the cached files in memory 27, and is preferably encapsulated. The data is then fed into the circular buffer 186 for each stream 18.

Metadata Insertion. Metadata 210 for each track 21 is inserted just before the track data 21 is fed into the buffer 186. Metadata 210 is stored along with scheduled tracks 21 in the database 21. The metadata 210 is preferably formatted within the database 14. The stream sourcing content delivery system 12 retrieves metadata 210, along with the playlist item information 21. At the time that the track 21 will play, the metadata 210 is encapsulated, using the metaclass and metatype from the stream configuration, and the metadata message 210 is added the buffer 186. In some system embodiments 12, "0x901" is used for cached metadata 210.

Relay Functionality. The stream sourcing content delivery system 12 exposes a listen thread, which is responsible for listening for inbound connections. When a connection is established, a relay negotiation occurs, such as in compliance with a relay protocol. Upon a successful negotiation, the file descriptor for the non-blocking socket is added to the listener send list.

Time Management. Some embodiments of the stream sourcing content system 12 require that a client 32 be able to display a time elapsed per song 21. While song-lengths 204, e.g. 204a (FIG. 8), are normally passed down along with song changes, a listener is not guaranteed to tune in during a song-change, i.e. just as a new song 21 begins. Therefore, some preferred embodiments of the stream sourcing content delivery system 12 are adapted to display time-remaining information 214 (FIG. 8), such as within metadata 210, which is inserted into the datastream 28.

In an exemplary embodiment of the stream sourcing content delivery system 12 which displays time-remaining information 214, the system 12 reads the length 204 of a track 21 as one of the data fields in the playlist fetch. As a song 21 is ready to be streamed, the stream sourcing content delivery system 12 looks at the corresponding time, and creates the following cached metadata message:

| | |
|---|---|
| Class = | 0x5 |
| Type = | 0x000 |
| MID = | incremental from startup |
| MTOT = | 0x00000001 |
| MCURR = | 0x00000001 |
| Payload = | [size of track in bytes][bytes sent] (these are both integers) |

After every N seconds, e.g. N=2 seconds, until the end of the track 21, the stream sourcing content delivery system 12 sends the 0x5000 message. However, instead of t=0 in the payload, the stream sourcing content delivery system 12 estimates the amount of time that has elapsed 212 (FIG. 8) in the track 21, and inserts that value:

$$\text{Payload=len=<track length in seconds>;t=<time elapsed>.} \quad (1)$$

The frequency of the repeated pass-thru metadata 210 is preferably configurable.

In some preferred system embodiments, the display of elapsed time 212 comprises the following features:

The system 12 looks for the first occurrence of a 0x5000 message, calculates the time remaining 214 for the given clipid, and initializes the display and timer to decrement the value.

The system 12 disregards subsequent 0x5000 messages until the clipid changes.

If the timer hits 0 before the system 12 sees a 0x5000 with a new clipid, the system 12 typically grays out the time remaining, i.e. this could occur if there is any drift, or if the time in the database is not exact.

On a song-change, the system 12 uses the song-length information 204 in the 0x3000 message, to initialize the timer.

Failover & Recovery Conditions.

Database is Down on Startup. Most embodiments of the stream sourcing content delivery system 12 keep a time snapshot, e.g. 5 minutes, of station information 30, playlists 18, and metadata 210. After each time period database sequence, e.g. after every 5 minutes, some embodiments of the stream sourcing content delivery system 12 writes a file to disk called FAIL0.bin. FAIL0.bin which contains station information 30, playlists 18, and metadata 210 for all streams 18.

Database and Content Store are Down at Startup. If FAIL0.bin doesn't exist and the database 14 is unavailable, the stream sourcing content delivery system exits.

Database and Content Store Fail for a Short Time. On a database sequence failure, the stream sourcing content delivery system 12 increases the frequency of polling the database 14 to every 30 seconds. For HTTP content grabs, the following applies:

HTTP 500—retry in 10 seconds; log the error

HTTP 404—ignored; after X 404's in a row, log the error

HTTP unavailable—retry in 30 seconds; log the error

Database & Content Store Fail for an Extended Time. If the database 14 and content store 20 fail for an extended period, the stream sourcing content delivery system 12 typically continues to advance through the playlist 18. If the system 12 reaches the second-to-last playlist item 21, the system 12 goes into a "looping mode" 200, and a log entry is preferably made, to note the required looping operation 200. The first track 21 in the playlist 18 is then cached into memory 27. After each track 21 finishes streaming, the stream sourcing content delivery system 12 checks for new items in the playlist 18, to stop the looping operation 200 if possible, i.e. to resume normal streaming of content 21.

Periodic Synchronization. Some embodiments of the stream sourcing content delivery system 12 comprise a periodic synchronization, such as to compensate for any time drift between playlists 18.

For example, in some system embodiments 12, whereby multiple stream sourcing content delivery processes may drift in their playlists 18 by small amounts over time, e.g. the course of a day, a synchronization may preferably be periodically performed, e.g. daily, to minimize the overall drift.

For example, in a system embodiment 12 which comprises a daily synchronization, the synchronization process is preferably performed at a time which minimizes the disruption of content playback for users, such as at late night or early morning.

For example, in an exemplary daily synchronization methodology, on embodiment of the stream sourcing content delivery system 12 stops and then begins streaming the next track that is scheduled for 5:00AM for a station 30. While such a synchronization could cause a cut in the song 21 that is being listening to, the process ensures that the system servers are synchronization, and would affect only a small group of users.

System Configuration. Some embodiments of the stream sourcing content delivery system 12 allow for the configuration of the following parameters:

PortBase: The port that listeners(blades) can connect to

MaxUser: The maximum number of listeners that the server will accept.

Password: Password for logging into the administrative interface.

LogFile: Path to the logfile

DBName: DatabaseID for Stream sourcing content delivery to use to log into the DB.

DBUser: UserID for Stream sourcing content delivery to use to log into the DB.

DBPassword: Password for the DB.

BroadcasterID: Maps to a table in the database to retrieve information about which streams this instance of stream sourcing content delivery is responsible for.

FlavorID: Streaming service

MaxPlaylist: The maximum number of playlist items in memory for an individual; its what it will loop on, in the event of db failure RealTime ScreenLog CpuCount: number of CPU's in the machine, if Stream sourcing content delivery cant detect it, which it does for solaris, but for Linux, it cannot.

GMTOffset: the "sysops" have to set this so that the DB, which is GMT based, returns the correct time to the stream sourcing content delivery for track play Logging. FIG. 9 is a first chart 220a of system logging for a stream sourcing content 10 delivery system 12. FIG. 10 is a second chart 220b of system logging for a stream sourcing content delivery system 12. FIG. 11 is a third chart of system logging 220c for a stream sourcing content delivery system 12. FIG. 12 shows database schema 250 for a stream sourcing content delivery system 12.

System Advantages. The stream sourcing content delivery system 12 and associated methods provide significant advantages over existing content delivery and broadcast systems, and provides improvements to the scheduling, caching, and/or playing of content, e.g. songs.

The stream sourcing content delivery system 12 delivers content 21 and metadata 210 to multiple distribution points 26, and is able to broadcast content indefinitely if the database 12 or content store 20 fails. If a connection is lost between the stream sourcing content delivery server 12 and the content store 20, the system 12 goes into a looping behavior 200, whereby the user's experience is uninterrupted. The looping behavior is avoids content blackouts for the user, i.e. the loop 200 is of sufficient length that it is typically not noticeable, and is preferably DMCA compliant.

The stream sourcing content delivery system 12 is also readily scaled to the number of broadcast streams 28a-28k, and allows operations to easily manage the source complex. The stream sourcing content delivery system 12 is readily expanded and scaled for a large number of stations 32, distribution points 26, clients, relays, and/or listeners. A plurality of systems 12 can readily be operated together, and may further comprise load balancing between systems 12.

As well, datastreams within the stream sourcing content delivery system 12 preferably comprise metadata associated with the steam and/or songs, e.g. to create song boundaries, as well as controlled buffering and synchronization.

Preferred embodiments of the stream sourcing content delivery system 12 sends content, on a per file basis, at a bit rate which matches the actual bit rate of reception and use, which avoids either over run or under run of data transfer.

Although the stream sourcing content delivery system and methods of use are described herein in connection with the delivery of music, i.e. songs, the apparatus and techniques can be implemented for a wide variety of electronic content, such as a wide variety of audio content, e.g. songs, dialog, discussion, video content, multimedia content, or any combination thereof, as desired.

Although the stream sourcing content delivery system and methods of use are described herein in connection with personal computers, mobile devices, and other microprocessor-based devices, such as portable digital assistants or network enabled cell phones, the apparatus and techniques can be implemented for a wide variety of electronic devices and systems, or any combination thereof, as desired.

As well, while the stream sourcing content delivery system and methods of use are described herein in connection with interaction between a user terminals and one or more radio station sites across a network such as the Internet, the stream sourcing content delivery system and methods of use can be implemented for a wide variety of electronic devices and networks or any combination thereof, as desired.

Accordingly, although the invention has been described in detail with reference to a particular preferred embodiment, persons possessing ordinary skill in the art to which this invention pertains will appreciate that various modifications and enhancements may be made without departing from the spirit and scope of the claims that follow.

What is claimed is:

1. A method of delivering streams of content, the method comprising:
periodically querying a database for multiple playlists, wherein each playlist of the multiple playlists is associated with multiple content items;
receiving the multiple playlists from the database based upon the periodic querying;
analyzing each of the received multiple playlists to determine content items that are already cached on a local disk and content items to be retrieved from a content source;
retrieving the content items to be retrieved for each of the received playlists from the content source;
caching the retrieved content items on the local disk;
creating streams of content by, for each playlist of the multiple playlists, concatenating content items associated with said each playlist;
upon receiving a request for one or more of the streams of content, transmitting the requested one or more streams of content to at least one distribution point for relaying to at least one client terminal; and
in response to a disruption in the retrieval from the content source of content items associated with a first playlist of the multiple playlists, wherein a first stream of content corresponds to the first playlist:
continuing to advance through content items of the first playlist;
copying a first content item of the first playlist from the local disk to a memory cache prior to reaching a last content item of the first playlist;
linking the last content item of the first playlist to the first content item of the first playlist to loop at least one of the content items of the first playlist in the first stream of content; and
transmitting the first stream of content containing the looped at least one of the content items of the first playlist to the at least one distribution point for relaying to the at least one client terminal.

2. The method of claim 1, further comprising:
checking for new content items of the first playlist as transmission of each of the content items of the first playlist finishes; and if there are new content items of the first playlist, resuming normal transmission of the first stream of content.

3. The method of claim 1, wherein the multiple content items include audio content.

4. The method of claim 1, wherein the multiple content items include video content.

5. The method of claim 1, further comprising:
providing metadata associated with at least one of the multiple content items; and
integrating the metadata with at least one of the one or more of the streams of content.

6. The method of claim 5, wherein the metadata includes content duration information.

7. The method of claim 5, wherein the metadata includes content time remaining information.

8. The method of claim 1, wherein the at least one client terminal includes at least one of a computer, a mobile device, a microprocessor-based device, a portable digital assistant, and a network enabled receiver.

9. The method of claim 1, wherein at least one of the requested one or more of the streams of content is transmitted at a rate that is matched to a rate of play at the at least one client terminal.

10. The method of claim 1, further comprising:
for each playlist, providing a buffer of a plurality of buffers with the stream of content corresponding to said each playlist,
wherein transmitting the requested one or more of the streams of content includes transmitting the requested one or more of the streams of content from one or more of the plurality of buffers.

11. The method of claim 1, further comprising removing cached content items from the local disk.

12. The method of claim 1, further comprising synchronizing the one or more of the streams of content with one or more schedules.

13. A method of delivering streams of content, the method comprising:
periodically querying a database for multiple playlists, wherein a playlist of the multiple playlists is associated with multiple items of content;
receiving the multiple playlists from the database;
analyzing the received multiple playlists to determine items of content that are already locally cached and items of content to be retrieved from one or more content sources;
retrieving the items of content to be retrieved from the one or more of the content sources;
locally storing the retrieved items of content;
for at least a first playlist of multiple playlists, concatenating associated items of content into a first stream;
upon receiving a request for the first stream, delivering the first stream to at least one distribution point for delivery to at least one client terminal; and
if retrieval of new items of content associated with the first playlist is disrupted:
continuing to advance through the first playlist for at least the first stream;
caching a first item of content of the first playlist into memory prior to reaching a last item of content of the first playlist;
linking the last item of content of the first playlist to the first item of content of the first playlist in order to repeat at least one of the items of content in the first stream; and
delivering the first stream containing the repeated at least one of the items of content to the at least one distribution point for delivery to the at least one client terminal 14. The method of claim 13, further comprising:
checking for new items of content of the first playlist as delivery of each of the items of content of the first playlist finishes; and
if there are new items of content of the first playlist, resuming normal delivery of the first stream.

15. The method of claim 13, wherein the multiple items of content include audio content.

16. The method of claim 13, wherein the multiple items of content include video content.

17. The method of claim 13, further comprising:
providing metadata associated with the multiple items of content; and
integrating the metadata with at least the first stream.

18. The method of claim 17, wherein the metadata includes content duration information.

19. The method of claim 17, wherein the metadata includes content time remaining information.

20. The method of claim 13, wherein the at least one client terminal includes at least one of a computer, a mobile device, a microprocessor-based device, a portable digital assistant, and a network enabled receiver.

21. The method of claim 13, wherein at least the first stream is transmitted at a rate that is matched to a rate of play at the at least one client terminal.

22. The method of claim 11, further comprising:
for at least the first playlist, providing one or more buffers with the first stream,
wherein delivering the first stream includes delivering the first stream from the one or more buffers.

23. The method of claim 13, further comprising removing locally stored items of content.

24. The method of claim 13, further comprising synchronizing the first stream with a first schedule.

25. A content delivery system, comprising:
a processor; and
a memory, wherein the system is configured to:
periodically query a database for multiple playlists, wherein a playlist of the multiple playlists is associated with multiple content items;
receive the multiple playlists from the database;
locally store content items;
analyze the received multiple playlists to determine which of the multiple content items are already stored locally or are content items to be retrieved from one or more content sources;
retrieve the content items to be retrieved from the one or more content sources;
concatenate associated content items into a first stream for at least a first playlist;
receive a request for the first stream;
deliver the first stream to at least one distribution point in response to the request for delivery from the distribution point to at least one client terminal; and
wherein if retrieval of content items associated with the first playlist is disrupted, the system is further configured to:
continue to advance through the first playlist for at least the first stream;
cache a first content item of the first playlist into memory prior to reaching a last content item of the first playlist;

repeat at least the first content item of the first playlist in the first stream after the last content item of the first playlist is reached; and deliver the first stream containing the repeated at least one of the content items to the at least one distribution point for delivery to the at least one client terminal.

26. The system of claim 25, wherein the system if further configured to:

check for content items of the first playlist as delivery of each of the content items of the first playlist finishes; and resume normal delivery of the first stream if there are new content items of the first playlist.

27. The system of claim 25, wherein the multiple content items include audio content.

28. The system of claim 25, wherein the multiple content items include video content.

29. The system of claim 25, wherein the system is further configured to:

integrate metadata associated with the content items within at least the first stream.

30. The system of claim 29, wherein the metadata includes content duration information.

31. The system of claim 29, wherein the metadata includes content time remaining information.

32. The system of claim 25, wherein the at least one client terminal includes at least one of a computer, a mobile device, a microprocessor-based device, a portable digital assistant, and a network enabled receiver.

33. The system of claim 25, wherein a transmission rate of at least the first stream is matched to a rate of play at the at least one client terminal.

34. The system of claim 25, wherein the system is further configured to:

buffer data; and deliver the first stream from the buffered data.

35. The system of claim 25, wherein the system is further configured to:

remove locally stored content items.

36. The system of claim 25, wherein the system is further configured to:

synchronize the first stream with a first schedule.

37. A non-transitory computer-readable storage medium having instructions stored thereon for causing a computing device to perform operations for delivering streams of content, the operations comprising:

periodically querying a database for multiple playlists, wherein a playlist of the multiple playlists is associated with multiple items of content;

receiving the multiple playlists from the database;

analyzing the received multiple playlists to determine items of content that are already locally cached and items of content to be retrieved from one or more content sources;

retrieving the items of content to be retrieved from the one or more content sources;

locally storing the retrieved items of content;

for at least a first playlist of the multiple playlists, concatenating associated items of content into a first stream;

upon receiving a request for the first stream, delivering the first stream to at least one distribution point for delivery to at least one client terminal; and if retrieval of new items of content associated with the first playlist is disrupted:

continuing to advance through the first playlist for at least the first stream;

caching a first item of content of the first playlist into memory prior to reaching a last item of content of the first playlist;

linking the last item of content of the first playlist to the first item of content of the first playlist in order to repeat at least one of the items of content in the first stream; and delivering the first stream containing the repeated at least one of the items of content to the at least one distribution point for delivery to the at least one client terminal.

38. The non-transitory computer-readable storage medium of claim 37, wherein the operations further comprise:

checking for new items of content of the first playlist as delivery of each of the items of content of the first playlist finishes; and if there are new items of content of the first playlist, resuming normal delivery of the first stream.

39. The non-transitory computer-readable storage medium of claim 37, wherein the operations further comprise:

providing metadata associated with the multiple items of content; and integrating the metadata with at least the first stream.

40. The non-transitory computer-readable storage medium of claim 37, wherein at least the first stream is transmitted at a rate that is matched to a rate of play at the at least one client terminal.

41. The non-transitory computer-readable storage medium of claim 37, wherein the operations further comprise:

for at least the first playlist, providing one or more buffers with the first stream, wherein delivering the first stream includes delivering the first stream from the one or more buffers.

42. The non-transitory computer-readable storage medium of claim 37, wherein the operations further comprise:

removing locally stored items of content; and synchronizing the first stream with a first schedule.

* * * * *

UNITED STATES PATENT AND TRADEMARK OFFICE
CERTIFICATE OF CORRECTION

| | | |
|---|---|---|
| PATENT NO. | : 7,912,920 B2 | Page 1 of 2 |
| APPLICATION NO. | : 10/688283 | |
| DATED | : March 22, 2011 | |
| INVENTOR(S) | : Loomis et al. | |

It is certified that error appears in the above-identified patent and that said Letters Patent is hereby corrected as shown below:

Title page, item (56), under "Other Publications", in Column 2, Line 2, delete "Inernet" and insert -- Internet --.

Page 3, item (56), under "Other Publications", in Column 1, Line 11, delete "Series." and insert -- Series, Jul. 21, 2002. --.

Page 3, item (56), under "Other Publications", in Column 1, Line 29, delete ""packet" and insert -- "Packet --.

Page 3, item (56), under "Other Publications", in Column 2, Line 3, delete "Soringer-Verlag;" and insert -- Springer-Verlag; --.

Page 3, item (56), under "Other Publications", in Column 2, Line 33, delete "mutimedia" and insert -- multimedia --.

Page 3, item (56), under "Other Publications", in Column 2, Line 34, delete "Mutlimedia Sytems;" and insert -- Multimedia Systems; --.

Page 3, item (56), under "Other Publications", in Column 2, Line 37, delete "Mutlimedia" and insert -- Multimedia --.

Page 3, item (56), under "Other Publications", in Column 2, Line 40, delete "Mutlimedia" and insert -- Multimedia --.

Page 3, item (56), under "Other Publications", in Column 2, Line 45, delete "Proceeedings" and insert -- Proceedings --.

Page 3, item (56), under "Other Publications", in Column 2, Line 50, delete "algorithim" and insert -- algorithm --.

Signed and Sealed this
Twenty-sixth Day of July, 2011

David J. Kappos
*Director of the United States Patent and Trademark Office*

CERTIFICATE OF CORRECTION (continued)
U.S. Pat. No. 7,912,920 B2

Page 3, item (56), under "Other Publications", in Column 2, Line 51, delete "samll" and insert -- small --.

Page 4, item (56), under "Other Publications", in Column 1, Line 32, delete "definiton" and insert -- definition --.

Column 15, line 52, in Claim 13, delete "of" and insert -- of the --.

Column 16, line 4, in Claim 13, delete "terminal" and insert -- terminal. --.

Column 16, line 31, in Claim 22, delete "claim 11," and insert -- claim 13,--.

Column 17, line 7, in Claim 26, delete "if" and insert -- is --.